(12) United States Patent  
Fujii

(10) Patent No.: US 9,485,367 B2  
(45) Date of Patent: Nov. 1, 2016

(54) CONNECTING IMAGE FORMING DEVICES BASED ON A COMMUNICATION SESSION COUNT

(71) Applicant: FUJI XEROX CO., LTD., Tokyo (JP)

(72) Inventor: Masaru Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/668,010

(22) Filed: Mar. 25, 2015

(65) Prior Publication Data

US 2016/0088167 A1   Mar. 24, 2016

(30) Foreign Application Priority Data

Sep. 18, 2014   (JP) .................................. 2014-190286

(51) Int. Cl.
*H04N 1/00* (2006.01)
*H04N 1/32* (2006.01)

(52) U.S. Cl.
CPC ...... *H04N 1/00209* (2013.01); *H04N 1/32358* (2013.01); *H04N 1/32523* (2013.01); *H04N 1/32539* (2013.01)

(58) Field of Classification Search
CPC ..................... H04N 1/00127; H04N 1/00209; H04N 1/32523
USPC ........................................................ 358/1.15
See application file for complete search history.

(56) References Cited

U.S. PATENT DOCUMENTS

| 6,643,284 | B1 | 11/2003 | Inoue et al. | |
| 7,812,985 | B2 * | 10/2010 | Nguyen | ............... G06F 3/1204 |
| | | | | 358/1.15 |
| 8,854,664 | B2 | 10/2014 | Yoshimura et al. | |

FOREIGN PATENT DOCUMENTS

| JP | 63-104161 A | 5/1988 |
| JP | 8-44612 A | 2/1996 |
| JP | 2000-115253 A | 4/2000 |
| JP | 2004-127074 A | 4/2004 |
| JP | 2013-3725 A | 1/2013 |

* cited by examiner

*Primary Examiner* — Eric A Rust
(74) *Attorney, Agent, or Firm* — Sughrue Mion, PLLC

(57) ABSTRACT

An image forming device includes a selection unit and an acquisition unit. The selection unit selects a bridge device from among multiple other connected image forming devices. The acquisition unit causes the bridge device to access another image forming device other than the bridge device, causes the bridge device to acquire information related to image data being stored in the other image forming device other than the bridge device, and acquires, from the bridge device, image data respectively being stored in the other image forming device other than the bridge device and in the bridge device.

15 Claims, 16 Drawing Sheets

FIG. 4

| DEVICE ID | COMMUNICATION SESSION COUNT S | COMMUNICATION PERFORMANCE | INTERNAL PROCESSING PERFORMANCE |
|---|---|---|---|
| DEVICE A | 2 | 10GB-TX | CPU, MEMORY |
| DEVICE B | 5 | 10GB-TX | ... |
| DEVICE C | 4 | ... | ... |
| DEVICE D | 3 | ... | ... |
| DEVICE E | 3 | ... | ... |
| ... | ... | ... | ... |
| ... | ... | ... | ... |
| DEVICE P | 1 | ... | ... |

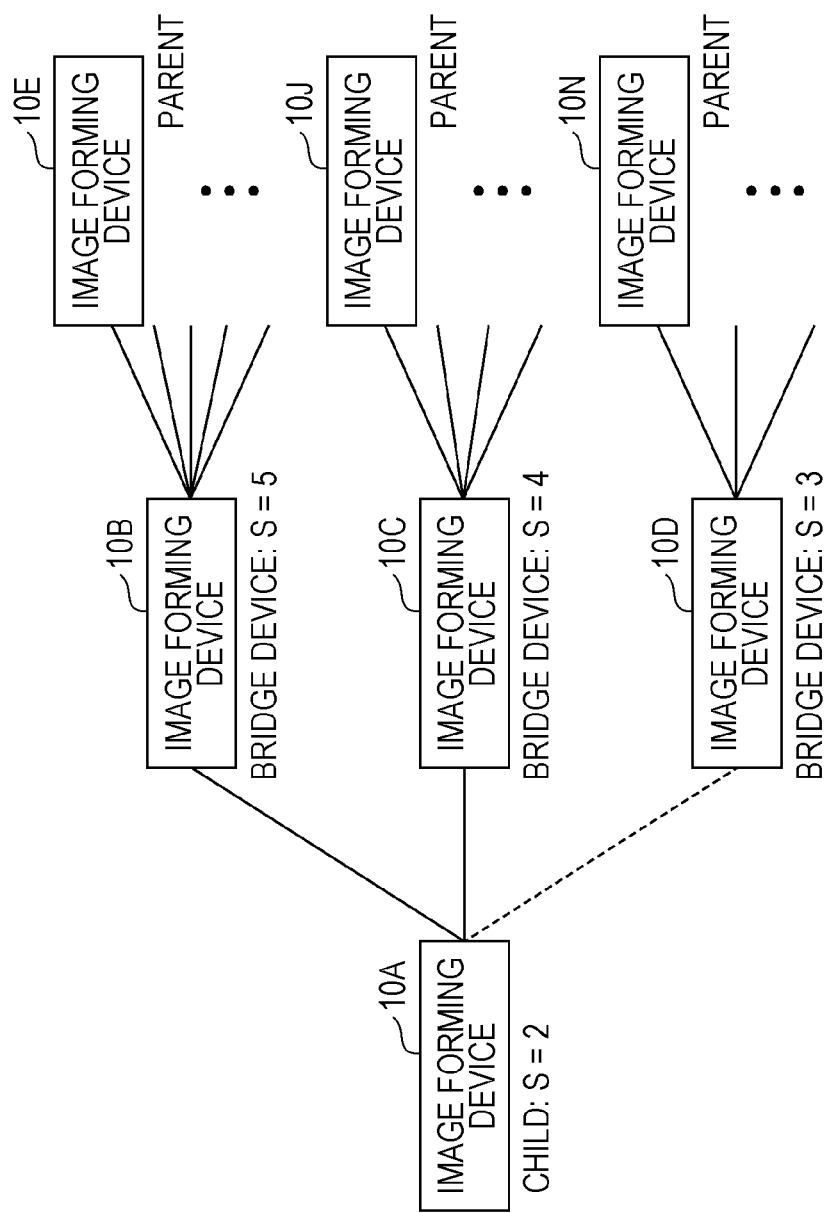

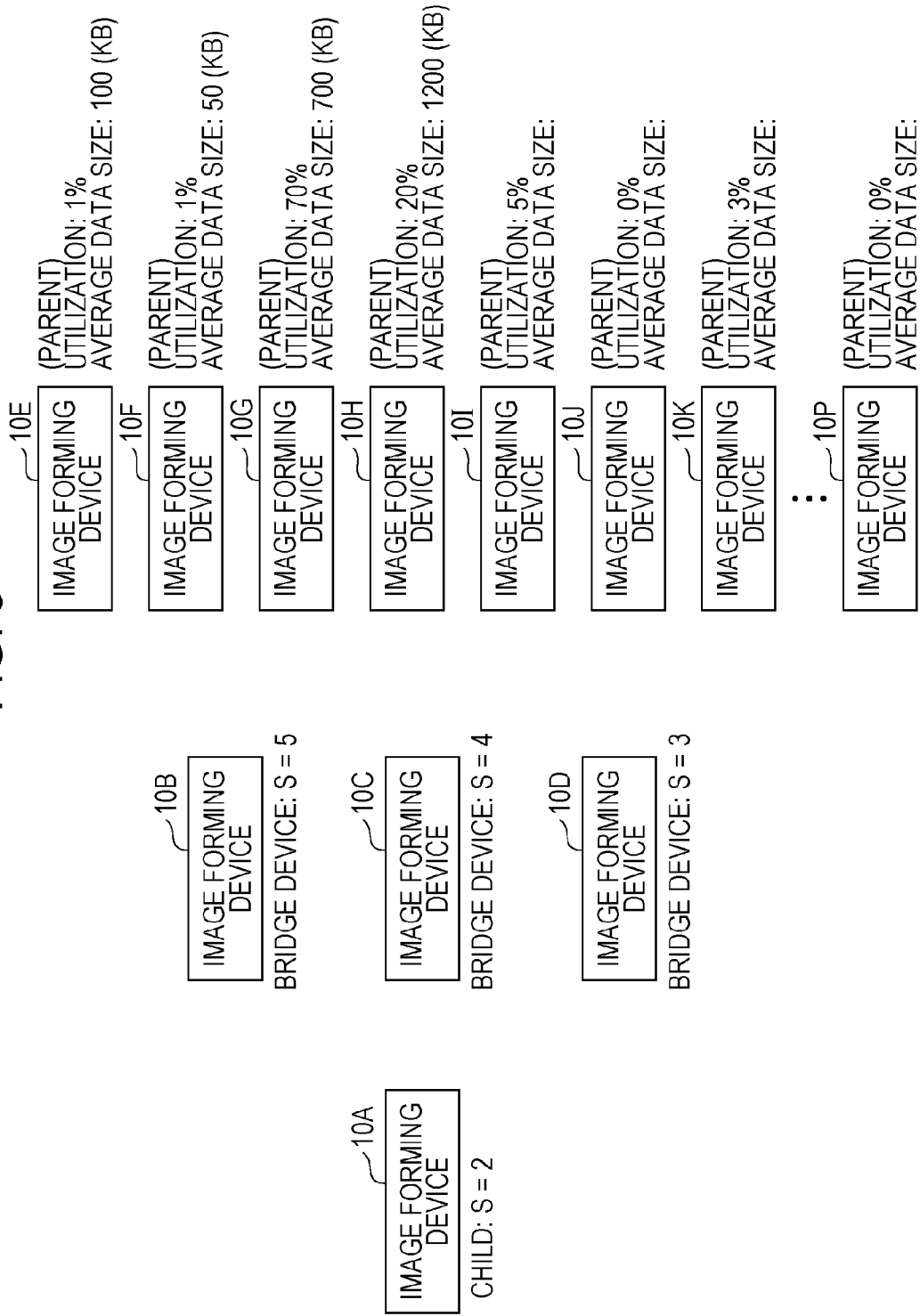

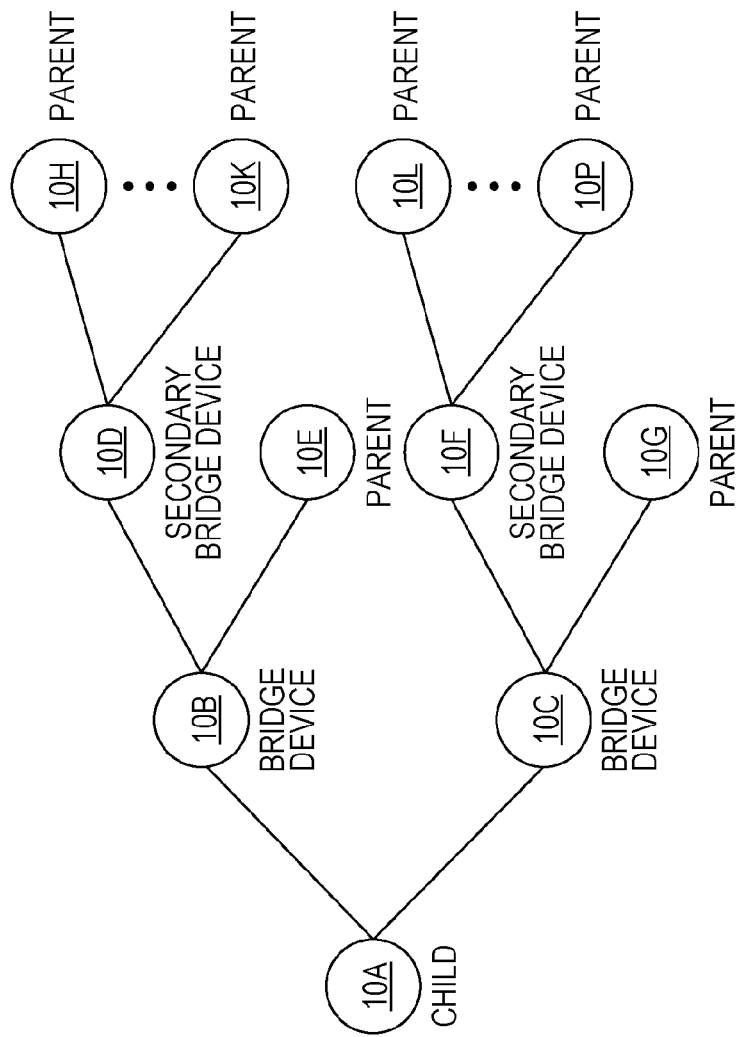

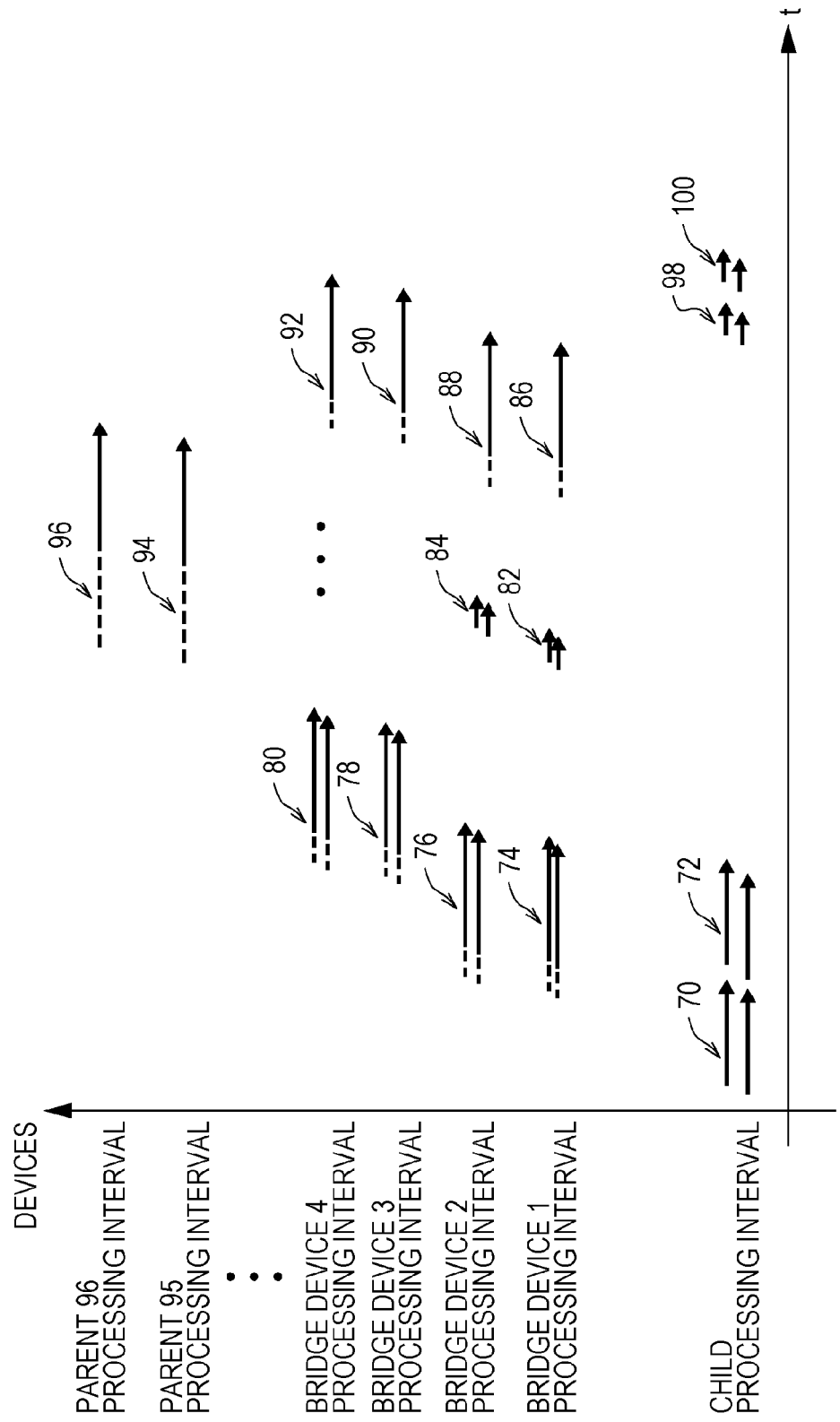

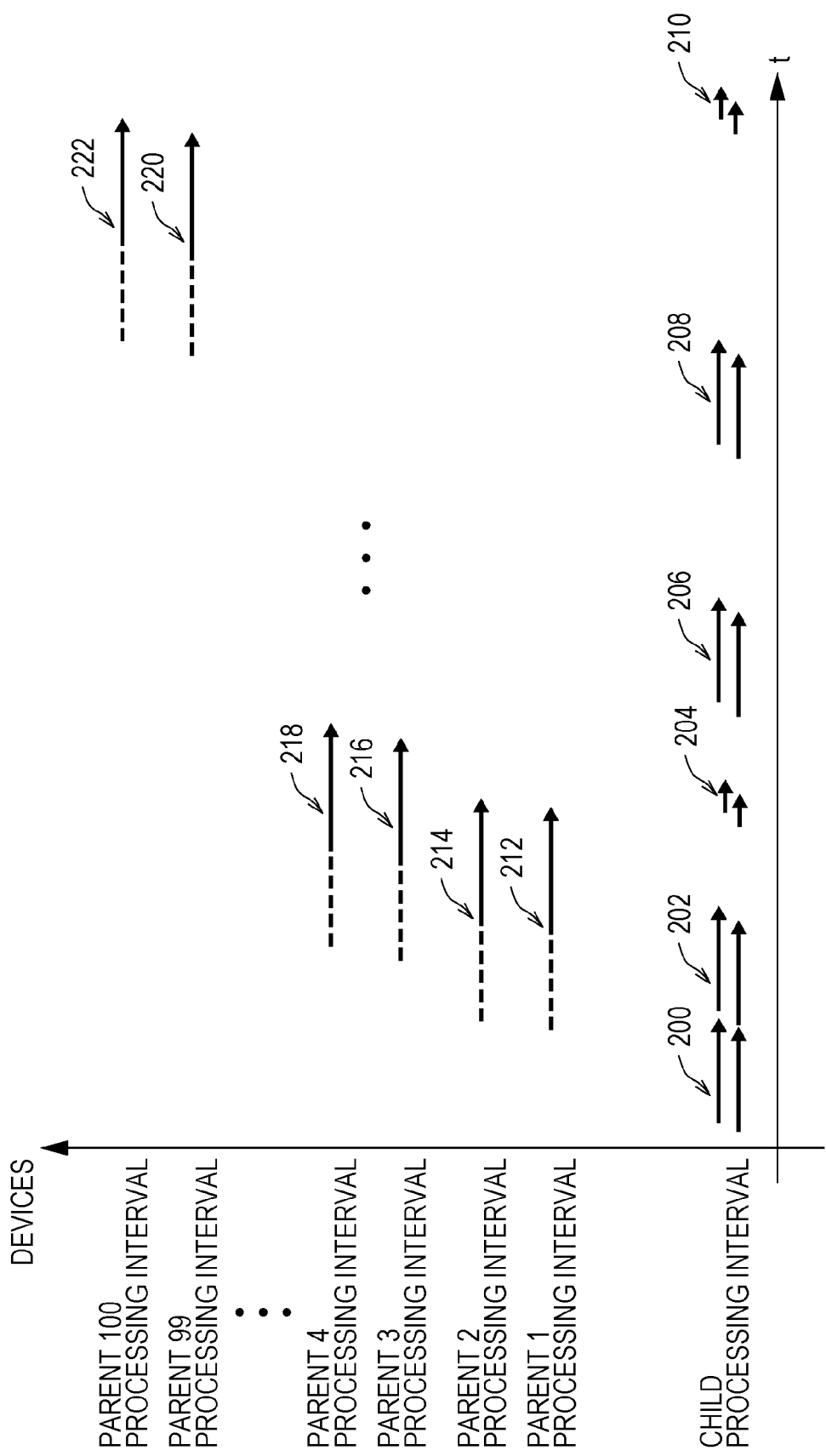

CONNECTING IMAGE FORMING DEVICES BASED ON A COMMUNICATION SESSION COUNT

CROSS-REFERENCE TO RELATED APPLICATIONS

This application is based on and claims priority under 35 USC 119 from Japanese Patent Application No. 2014-190286 filed Sep. 18, 2014.

BACKGROUND

Technical Field

The present invention relates to an image forming device, an information processing method, and a non-transitory computer readable medium.

SUMMARY

According to an aspect of the invention, there is provided an image forming device that includes a selection unit and an acquisition unit. The selection unit selects a bridge device from among multiple other connected image forming devices. The acquisition unit causes the bridge device to access another image forming device other than the bridge device, causes the bridge device to acquire information related to image data being stored in the other image forming device other than the bridge device, and acquires, from the bridge device, image data respectively being stored in the other image forming device other than the bridge device and in the bridge device.

BRIEF DESCRIPTION OF THE DRAWINGS

An exemplary embodiment of the present invention will be described in detail based on the following figures, wherein:

FIG. 4 is a diagram illustrating an example of a device list;

FIG. 6 is a diagram illustrating an example of connection relationships among image forming devices;

FIG. 8 is a diagram illustrating an example of utilization and average data size with respect to parents;

FIG. 14 is a diagram illustrating another example of connection relationships;

FIG. 15 is a diagram for explaining process times according to the exemplary embodiment; and FIG. 16 is a diagram for explaining process times according to a comparative example.

DETAILED DESCRIPTION

Figure 1:
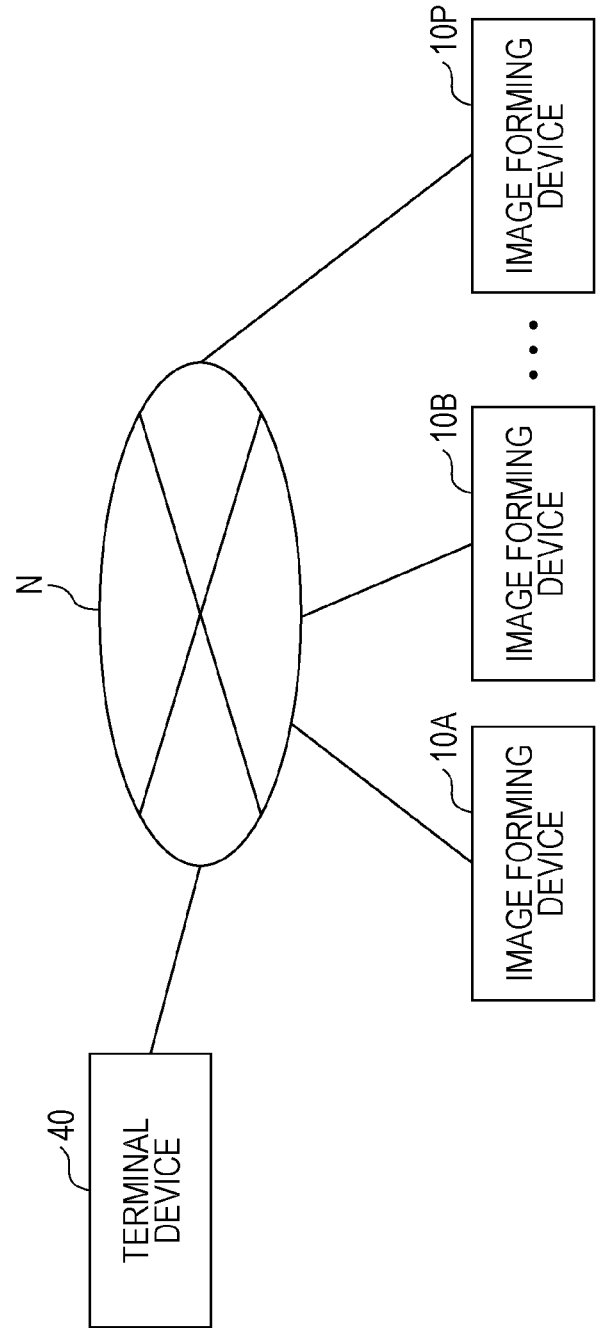
FIG. 1 is a block diagram illustrating an image forming system according to an exemplary embodiment of the present invention.

FIG. 1 illustrates an example of an image forming system according to an exemplary embodiment of the present invention. The image forming system includes multiple image forming devices (as an example, the image forming devices 10A to 10P). Note that when the image forming devices 10A, 10B, . . . , 10P are not being individually distinguished, the collective term "image forming device 10" will be used. The multiple image forming devices 10 are connected to a communication link N such as a network. In the example illustrated in FIG. 1, 16 image forming devices 10 are included in the image forming system. However, this is merely one example, and a number of multiple image forming devices 10 other than 16 may also be included in the image forming system. Also, a terminal device 40 is connected to the communication link N. Multiple terminal devices 40 may also be connected to the communication link N.

The image forming device 10 is an electrophotographic printer, for example. The terminal device 40 is equipped with a function of transmitting image data to the image forming device 10. The image forming device 10 is equipped with a function of storing image data transmitted from the terminal device 40.

Figure 2:
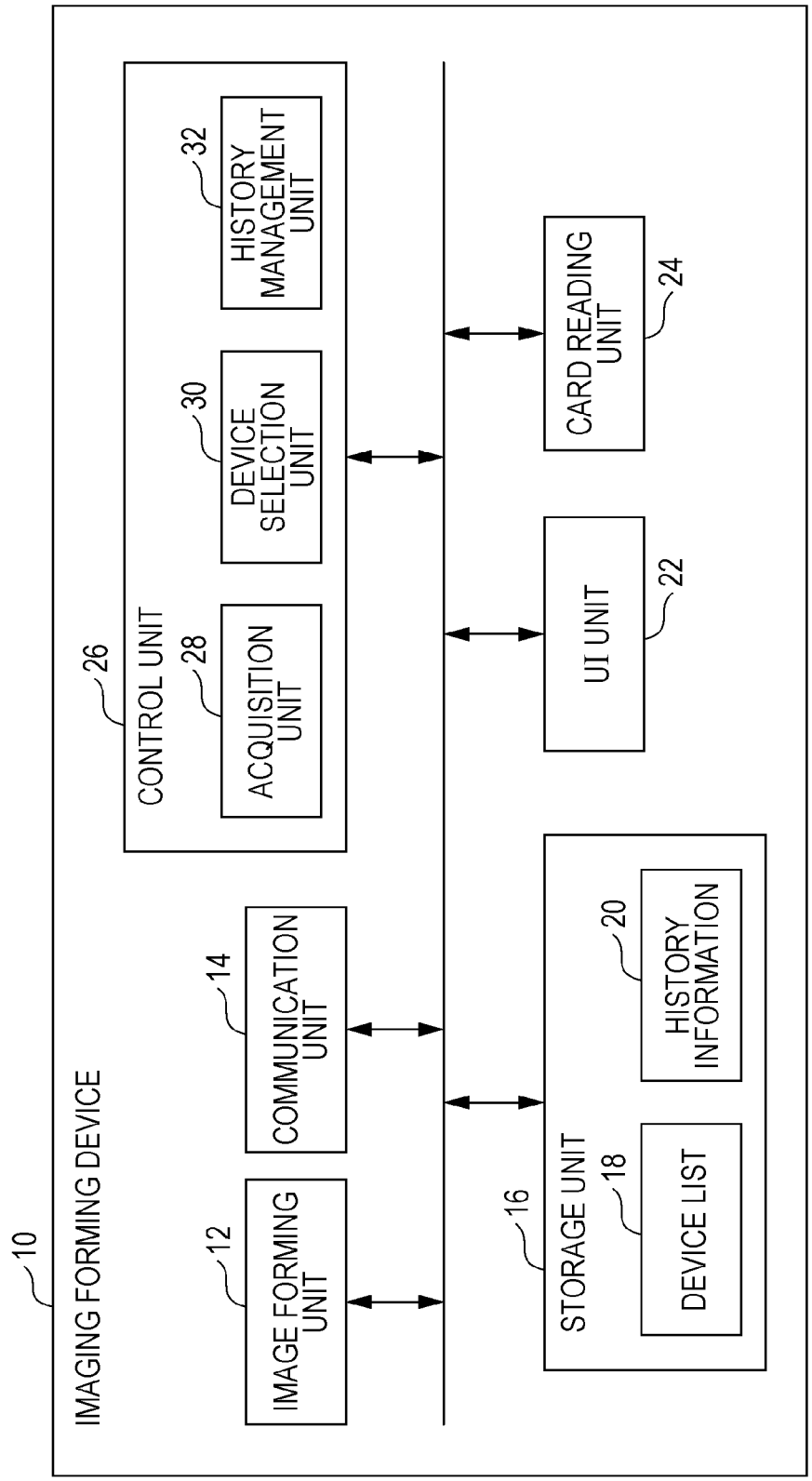
FIG. 2 is a block diagram illustrating an image forming device.

FIG. 2 illustrates a configuration of the image forming device 10. An image forming unit 12 forms an image corresponding to image data on a print medium such as paper. A communication unit 14 is a communication interface connected to the communication link N. The communication unit 14 is equipped with a function of receiving data from another device, and a function of transmitting data to another device. There is a limit to the number of devices that the communication unit 14 may connect to at the same time (the communication session count). The communication session count for each of the image forming devices 10A to 10$p$ may be the same or different.

A storage unit 16 is a storage device such as a hard disk. The storage unit 16 stores image data transmitted from the terminal device 40, and authentication information for authenticating a user. The image data is accompanied by related information. Related information is meta-information of the image data, and for example, includes image identification information for identifying the image data (such as an image data ID), information indicating a creation time of the image data, and user identification information for identifying the user who stored the image data (such as a user ID). Otherwise, the related information may also include information such as information that indicating printing parameters, information that indicates the volume of image data, and information that indicates the data format. The authentication information includes user identification information and security information. The security information is information for confirming the identity of the user, such as a password, for example.

Also, the storage unit 16 stores a device list 18 and history information 20. The device list 18 is information that indicates all image forming devices 10 included in the image forming system. The device list 18 includes device identification information for identifying each image forming device 10, information that indicates the communication session count of each image forming device 10 (the number of devices that the relevant image forming device 10 connects to (communicates with) at the same time), information indicating the communication performance of each image forming device 10 (such as the communication speed), and information indicating the internal processing performance of each image forming device 10 (information related to the CPU, memory, and internal bus). Note that the device list 18 may also be stored in a device such as a server. In this case, the device list 18 may also not be stored in the image forming device 10. The device list 18 will be discussed in further detail later.

The history information 20 is information that indicates a usage history of each image forming device 10 for each user. For example, the utilization of each image forming device 10 by each user, and the data size of image data handled at any given time by each user, are managed as a usage history. Specifically, the utilization of each image forming device 10 by each user is computed on the basis of the number of times that image data is stored in each image forming device 10 by each user. In addition, the data size of the image data stored by each user is managed as a history. In this way, the history information 20 is information that indicates, for each user, a history of image data storage for each image forming device 10 (storage history information).

Note that the history information 20 may also be information that indicates, for each user, a history of each image forming device 10 from which image data was acquired (acquisition history information). In this case, the utilization of each image forming device 10 by each user is computed on the basis of the number of times that image data is acquired from each image forming device 10 by each user. In addition, the data size of the image data acquired by each user is managed as a history. Note that the history information 20 may also be stored in a server, such as an authentication server. In this case, the history information 20 may also not be stored in the image forming device 10. The history information 20 will be discussed in further detail later.

A user interface unit (UI unit) 22 includes an operating unit and a display unit. The operating unit is an input device such as an operating panel. The display unit is a display device such as a liquid crystal display. A card reading unit 24 is equipped with a function of reading information stored in an authentication card (such as an integrated circuit (IC) card). The authentication card stores the user identification information and the security information included in the authentication information, for example. The authentication card is handed over to the user in advance to conduct user authentication. Note that the operating unit may also be used to input the user identification information and security information.

A control unit 26 controls the operation of each component of the image forming device 10. For example, if image data and related information is transmitted from the terminal device 40, the control unit 26 causes the storage unit 16 to store the image data and the related information.

Also, the control unit 26 includes an acquisition unit 28, a device selection unit 30, and a history management unit 32. The acquisition unit 28 references the device list 18, and accesses an image forming device 10 included in the device list 18. Subsequently, the acquisition unit 28 acquires related information related to image data from the accessed image forming device 10. For example, if user identification information is input from the operating unit of the UI unit 22 or from the card reading unit 24, the acquisition unit 28 acquires related information of image data associated with the user identification information from the accessed image forming device 10. The control unit 26 causes the display unit of the UI unit 22 to display the related information. For example, the control unit 26 causes the display unit to display the related information in a list. If the user selects related information from the list, the acquisition unit 28 acquires image data corresponding to the related information selected by the user from the image forming device 10 in which the image data is being stored. Subsequently, the image forming unit 12 forms an image corresponding to the acquired image data on a sheet of paper. If the image forming device 10 is accessing itself, the acquisition unit 28 accesses the storage unit 16 in the image forming device 10 itself to acquire related information and image data.

The control unit 26 is equipped with a function of switching the method of accessing another image forming device 10. For example, if the number of other image forming devices 10 is greater than the communication session count of the image forming device 10 itself, the control unit 26 executes access using a bridge device. On the other hand, if the number of other image forming devices 10 is less than or equal to than the communication session count of the image forming device 10 itself, the control unit 26 executes direct access without using a bridge device. A bridge device is a device selected from among the multiple other image forming devices 10, and accesses another image forming device 10 on behalf of the image forming device 10 itself.

The device selection unit 30 selects one or multiple bridge devices from among the multiple other image forming devices 10. Hereinafter, an image forming device 10 that actually conducts printing is designated a "child", while a device other than a bridge device from among the multiple other image forming devices 10 is designated a "parent". A bridge device functions as a proxy for a child. In other words, the bridge device accesses the parent on behalf of the child, and acquires the related information of image data being stored in the parent. The bridge device transmits related information being stored in the parent and related information being stored in the bridge device itself to the child. In this way, when a bridge device is selected, the acquisition unit 28 of the child acquires, from the bridge device, related information respectively stored in both the parent and the bridge device.

The device selection unit 30 selects a bridge device from among the multiple other image forming devices 10 on the basis of the communication session count of each of the multiple other image forming devices 10, and the number of the multiple other image forming devices 10. For example, the device selection unit 30 selects a bridge device so that the total communication session count of the selected bridge device group becomes equal to or greater than the number of devices other than bridge devices from among the multiple other image forming devices 10 (all parents). In other words, a bridge device is selected so that [total communication session count of selected bridge device group]≥([total number of parents]−[total number of bridge devices]).

Also, the device selection unit 30 selects a parent to be accessed by a bridge device (a parent to assign to a bridge device). For example, the device selection unit 30 selects a parent to assign to each bridge device by using the history information 20. A specific process by the device selection unit 30 will be discussed in further detail later.

Note that the device selection unit 30 may also select one or multiple secondary bridge devices from the devices other than bridge devices among the multiple other image forming devices 10. In this case, the secondary bridge device acquires related information from the parent, and transmits, to the bridge device, related information respectively stored in both the parent and the secondary bridge device itself. The bridge device transmits related information being stored in the parent, the secondary bridge device, and the bridge device itself to the child. Obviously, another bridge device that acts as a bridge between the secondary bridge device and the parent may additionally be selected.

The history management unit 32 manages a usage history of the image forming device 10 by each user. For example, the history management unit 32 manages, as a usage history, a count of the number of times the image forming device itself has been used by each user, and the data size of image data handled at any given time on the image forming device 10 itself by each user. Individual history information that indicates the usage count of the image forming device 10 and the data size of the handled image data is shared among the image forming devices 10A to 10P. Subsequently, the history management unit 32 of each image forming device 10 creates the history information 20 by merging the individual history information from each of the image forming devices 10A to 10P. As discussed earlier, the history information 20 indicates the utilization of each image forming device 10 by each user, and the data size of image data handled at any given time by each user.

In the case of adopting storage history information as the history information 20, the history management unit 32 manages, for each user, a history of the storage of image data with respect to the image forming device 10 itself. Specifically, the history management unit 32 counts the number of times that image data has been stored in the image forming device 10 itself by each user (this corresponds to an example of a usage count). Also, every time image data is stored, the history management unit 32 records the data size of the image data stored at that time in the image forming device 10 itself by each user, and calculates an average value of the data size of the image data stored per one storage process. Subsequently, individual storage history information that indicates the storage count with respect to the image forming device 10 itself as well as the average value of the data size of the image data is shared among the image forming devices 10A to 10P. For example, the communication unit 14 of each image forming device 10 transmits the individual storage history information for each user with respect to the image forming device 10 itself to the other image forming devices 10. Specifically, the communication unit 14 of the image forming device 10A transmits the individual storage history information for each user with respect to the image forming device 10A to the image forming devices 10B to 10P. The image forming devices 10B to 10P are similar to the above. Subsequently, the history management unit 32 of each image forming device 10 calculates, for each user, the utilization of each image forming device 10, on the basis of the storage count of each user with respect to each image forming device 10. For example, the history management unit 32 of each image forming device 10 calculates, for each user, the total storage count with respect to all image forming devices 10, and divides the storage count for each user with respect to each image forming device 10 by the total for each user. Consequently, the utilization of each user with respect to each image forming device 10 is calculated. As a specific case, suppose that image data of the user with the user ID "user001" is stored a total of 100 times with respect to the image forming devices 10A to 10P, and of these, the storage count in the image forming device 10A is 90 times. In this case, the utilization of the image forming device 10A by the relevant user becomes (90/100)×100=90%. The utilization for the other image forming devices 10 and other users is calculated according to a similar method.

In the case of adopting acquisition history information as the history information 20, the history management unit 32 manages, for each user, a history of the image forming device 10 from which image data was acquired. Specifically, the history management unit 32 counts, for each user, the number of times that image data has been acquired from each image forming device 10. Also, every time image data is acquired, the history management unit 32 records the data size of the image data acquired at that time by each user, and calculates an average value of the data size of the image data acquired per one acquisition process. Subsequently, individual acquisition history information that indicates the acquisition count from each image forming device 10 as well as the average value of the data size of the image data is shared among the image forming devices 10A to 10P. For example, the communication unit 14 of each image forming device 10 transmits the individual acquisition history information for each user with respect to the image forming device 10 itself to the other image forming devices 10. Specifically, the communication unit 14 of the image forming device 10A transmits the individual acquisition history information for each user with respect to the image forming device 10A to the image forming devices 10B to 10P. The image forming devices 10B to 10P are similar to the above. Subsequently, the history management unit 32 of each image forming device 10 calculates, for each user, the total acquisition count from all image forming devices 10, and divides the acquisition count for each user from each image forming device 10 by the total for each user. Consequently, the utilization of each user with respect to each image forming device 10 is calculated. As a specific case, suppose that image data of the user with the user ID "user001" is acquired a total of 100 times from the image forming devices 10A to 10P, and of these, the acquisition count from the image forming device 10A is 90 times. In this case, the utilization of the image forming device 10A by the relevant user becomes (90/100)×100=90%. The utilization for the other image forming devices 10 and other users is calculated according to a similar method.

Note that the image forming device 10 may also be a printer that forms an image according to a method other than an electrophotographic method. The image forming device 10 may also be equipped with at least one function from among a copy function, a scan function, and a facsimile function.

Figure 3:
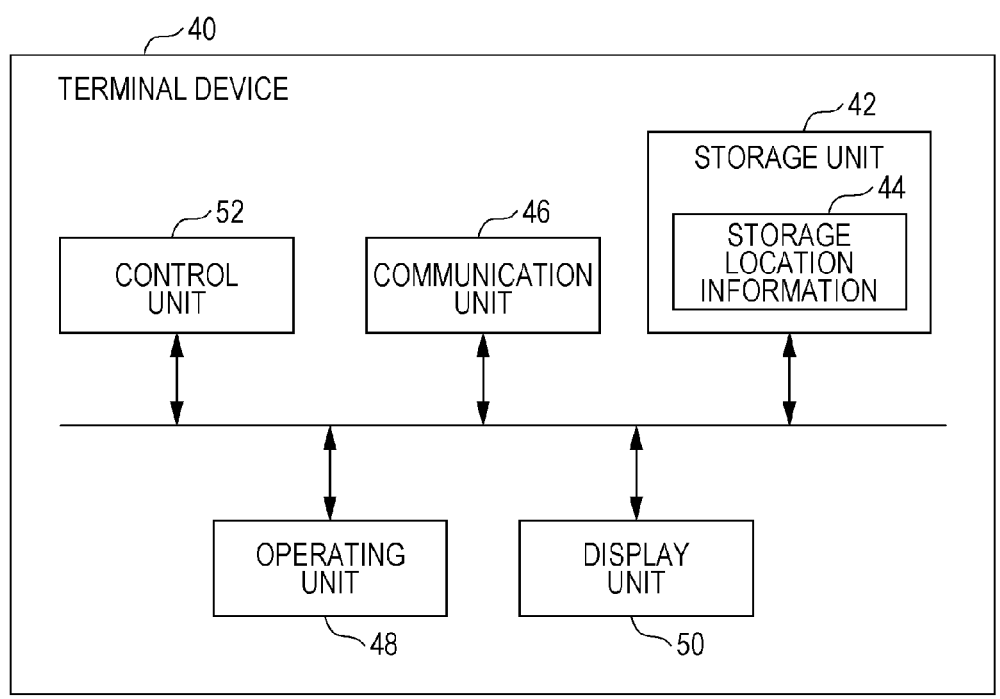
FIG. 3 is a block diagram illustrating a terminal device.

FIG. 3 illustrates a configuration of the terminal device 40. A storage unit 42 is a storage device such as a hard disk. Storage location information 44 is stored in the storage unit 42. Also, a printer driver is stored in the storage unit 42. A printer driver is a program that has a function of controlling the image forming device 10. The storage location information 44 is information that indicates the image forming device 10 storing image data transmitted from the terminal device 40. In the example of the image forming system illustrated in FIG. 1, the storage location information 44 is information indicating one of the image forming devices 10A to 10P. The storage location information 44 is device identification information of the image forming device 10, for example. As another example, the storage location information 44 may also be an Internet Protocol (IP) address assigned to the image forming device 10. As an example, the storage location information 44 is device identification information of the image forming device 10C. Note that the storage location information 44 may also be modified by the user.

A communication unit 46 is a communication interface connected to the communication link N. The communication unit 46 is equipped with a function of receiving data from another device, and a function of transmitting data to another device. For example, the communication unit 46 is equipped with a function of transmitting image data and related information specified by the user to an image forming device 10 indicated by the storage location information 44.

An operating unit 48 is an input device such as a keyboard and mouse, for example. A display unit 50 is a display device such as a liquid crystal display. A control unit 52 controls the operation of each component of the terminal device 40.

(Overview of Processing in Image Forming System)

An overview of processing by the image forming system will now be described. First, the user uses the operating unit 48 of the terminal device 40 to specify image data to be stored, and issues an instruction to store image data. The communication unit 46, under control of the control unit 52, transmits the image data and related information specified by the user to an image forming device 10 indicated by the storage location information 44. As an example, since the storage location information 44 indicates the image forming device 10C, the image data and related information is transmitted to the image forming device 10C.

The communication unit 14 of the image forming device 10C receives the image data and related information transmitted from the terminal device 40. Subsequently, the control unit 26 causes the storage unit 16 to store the received image data and related information.

The user, after issuing the storage instruction, moves to one of the image forming devices 10A to 10P. For example, the user may move to the image forming device 10 that he or she normally uses, and if that image forming device 10 is already in use, the user may move to another image forming device 10. Alternatively, the user may move to the closest image forming device 10 from his or her location. Herein, suppose that the user moves to the image forming device 10A illustrated in FIG. 1.

If the user inputs user identification information and security information into the image forming device 10A, the acquisition unit 28 of the image forming device 10A accesses an image forming device 10 (parent) included in the device list 18. Subsequently, the acquisition unit 28 acquires the image data and related information associated with the user identification information from the accessed image forming device 10 (parent). If a bridge device has been selected by the device selection unit 30, the acquisition unit 28 of the image forming device 10A requests the bridge device to acquire image identification information. The acquisition unit 28 acquires related information from the parent on behalf of the image forming device 10A, and transmits the related information to the image forming device 10A. The control unit 26 of the image forming device 10A causes the display unit of the UI unit 22 to display a list of acquired related information. If the user selects image data from the list, the acquisition unit 28 acquires the selected image data from the image forming device 10 in which the selected image data is being stored. For example, if image data being stored in the image forming device 10C is selected, the acquisition unit 28 acquires the selected image data from the image forming device 10C. The image forming unit 12 forms an image corresponding to the image data on a sheet of paper.

As above, the image forming device 10 is equipped with a function of forming an image by acquiring image data being stored in another image forming device 10. Consequently, the user is not limited to storing image data in the image forming device 10 that actually executes printing. If the image data is stored in any of the multiple image forming devices 10 included in the image forming system, printing may be realized at any of the image forming devices 10.

(Specific Example of Device List 18)

Next, a specific example of the device list 18 will be described with reference to FIG. 4. The device list 18 is stored in the storage unit 16 of each image forming device 10.

The device list 18 includes device identification information (for example, a device ID) of all image forming devices 10 included in the image forming system (the image forming devices 10A to 10P). For example, "Device A" is the device ID of the image forming device 10A. "Device B" is the device ID of the image forming device 10B. "Device C" is the device ID of the image forming device 10C. "Device D" is the device ID of the image forming device 10D. "Device E" is the device ID of the image forming device 10E. "Device P" is the device ID of the image forming device 10P.

Additionally, the device list 18 includes the communication session count S of each of the image forming devices 10A to 10P, information indicating the communication performance, and information indicating the internal processing performance. The communication session count S is an upper limit on the number of devices that an image forming device 10 connects to (communicates with) at the same time. For example, the communication session count S of the image forming device 10B is "5", which means that the image forming device 10B is equipped with a function of communicating with a maximum of five image forming devices 10 at the same time. The communication performance is, for example, the communication speed of each image forming device 10, and may be the communication speed of a network interface card (NIC), for example. Information indicating the communication speed is included in the device list 18 as the information indicating the communication performance. The internal processing performance is, for example, the processing performance (CPU type) of the CPU installed in each image forming device 10, the memory capacity, and the transfer speed of the internal bus (for example, the transfer speed to and from a hard disk). The internal processing performance rises with a higher CPU processing performance, a higher memory capacity, and a faster bus transfer speed. Information indicating the CPU processing performance, the memory capacity, and the bus transfer speed is included in the device list 18 as the information indicating the internal processing performance. The device list 18 may also include information indicating the status (on or off) of the power supply of each image forming device 10, or information indicating a communication status (such as busy or idle) of each image forming device 10.

The device list 18 is created by an administrator, for example. Note that when a new image forming device 10 is connected to the communication link N, the control unit 26 of each image forming device 10 may also sense the newly connected image forming device 10. In this case, the control unit 26 adds the device ID, the communication session count S, information indicating the communication performance, and information indicating the internal processing performance of the newly connected image forming device 10 to the device list 18.

(Specific Example of Bridge Device)

Next, a specific process by the device selection unit 30 will be described. As an example, suppose that the image forming device 10A is used as a child, and printing is conducted by the image forming device 10A. In this case, the device selection unit 30 of the image forming device 10A selects a bridge device from among the image forming devices 10B to 10P.

The device selection unit 30 of the image forming device 10 adds up the communication session counts in order of largest communication session count from among the image forming devices 10B to 10P. An image forming device 10 that is added up is used as a bridge device. An image forming device 10 added up during the stage where [added sum]≥ ([total number of parents]−[total number of bridge devices]) is used as a bridge device. All other devices are treated as parents.

The selection procedure will now be described in detail. First, the device selection unit 30 of the image forming device 10A sorts the ordering of the image forming devices 10B to 10P in the device list 18 according to the communication session count. For example, the device selection unit 30 sorts the image forming devices 10B to 10P in order of largest communication session count.

Subsequently, the device selection unit 30 selects a bridge device from among the image forming devices 10B to 10P according to the following formula (1).

$$\sum_{Di=1}^{b} S_{Di} \geq p - b \quad (1)$$

Herein, $D_i$ is the device number of the image forming devices 10B to 10P after sorting. The device number of the image forming device 10 with the maximum communication session count is #1, while the device number of the image forming device 10 with the second largest communication session count is #2, and so on similarly thereafter. Note that a ranking is applied even for multiple image forming devices 10 with the same communication session count. One of the devices is a higher rank, while any others are given a lower rank.

The term p is the total number of parents, while b is the total number of bridge devices, and $S_{Di}$ is the communication session count of the bridge device $D_i$.

The number of bridge devices is the minimum value from among multiple values of b that satisfy the above formula (1). Additionally, the image forming devices 10 selected as a bridge device are the image forming devices 10 from $D_1$ to $D_b$ according to the value of b (minimum value). The number of devices decided in this way corresponds to an example of a target number of devices.

Note that an image forming device 10 selected as a bridge device may have a communication session count of 1. If the communication session count is 1, the number of parents to which that bridge device corresponds becomes 1. Even in this case, the bridge device acquires related information from the one parent, and then transmits the related information from the parent and related information stored in the bridge device itself to the child. In this way, related information from two devices is transmitted to the child. As a result, related information may be acquired from more devices than in the case of a child directly acquiring related information from a parent. Consequently, the communication session count of a bridge device may be 1 or more.

Figure 5:
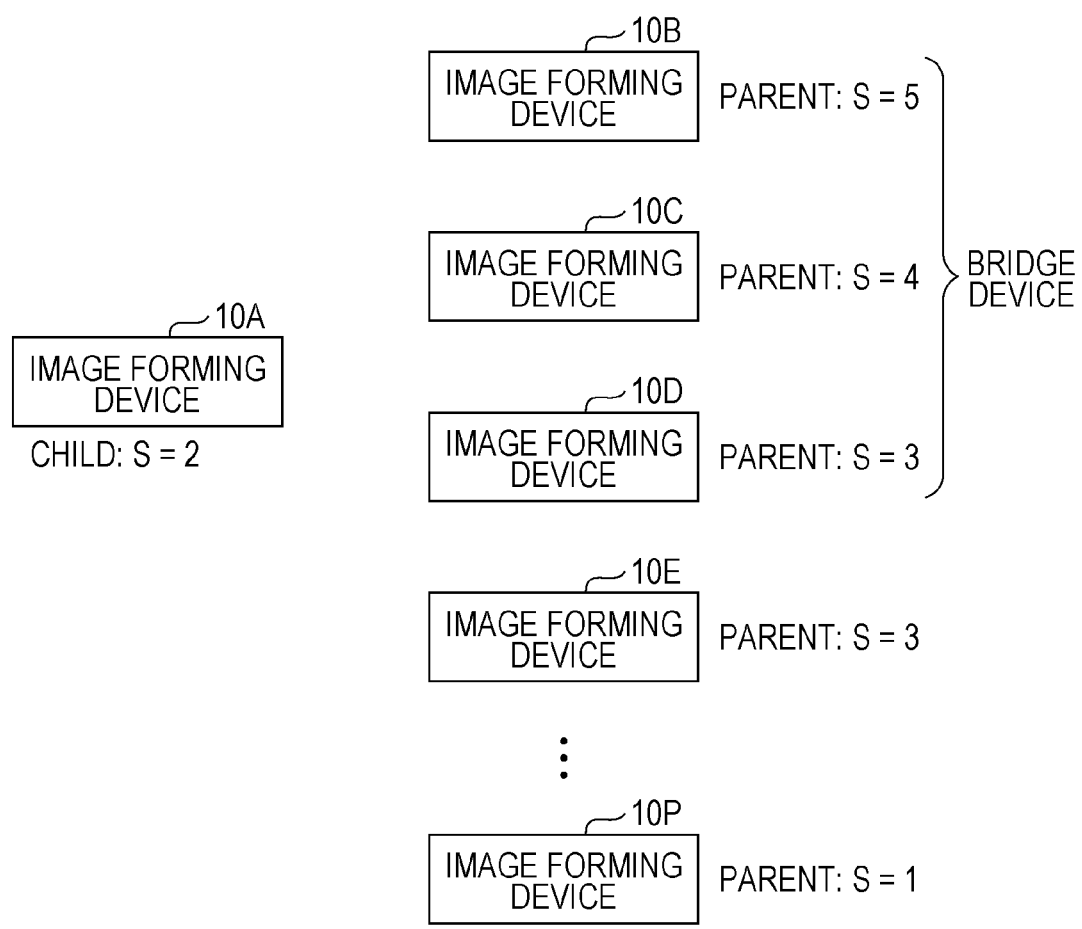
FIG. 5 is a diagram for explaining a bridge device selection method.

A specific example of a selection procedure will now be described with reference to FIGS. 4 and 5. FIG. 5 illustrates image forming devices 10A to 10P. The image forming devices 10B to 10P are parents, and the total number of parents is 15. The image forming devices 10B to 10P are sequentially arranged on the basis of communication session count. Note that in the example illustrated in FIGS. 4 and 5, for the sake of convenience, the original order in the device list 18 matches the order after sorting on the basis of the communication session count. This is merely one example, and the order in the device list 18 is modified on the basis of the communication session count.

The device selection unit 30 of the image forming device 10A adds up the communication session counts S in order of largest communication session count S from among the image forming devices 10B to 10P. In the example illustrated in FIG. 5, the device selection unit 30 adds together the communication session count S "5" of the image forming device 10B and the communication session count S "4" of the image forming device 10C. As a result, the sum "9" is calculated. At this stage, the image forming devices 10B and 10C become bridge device candidates, and the total number of bridge devices becomes "2". Also, [total number of parents (15)]−[total number of bridge devices (2)]=13. Since the communication session count sum "9" is less than "13", the device selection unit 30 continues adding. Next, the device selection unit 30 adds together the sum "9" and the communication session count S "3" of the image forming device 10D. As a result, the sum becomes "12". At this stage, the image forming device 10D becomes a bridge device candidate, and the total number of bridge devices becomes "3". At this stage, [total number of parents (15)]−[total number of bridge devices (3)]=12. The communication session count sum "12" becomes equal to the difference "12", and the total number "3" of bridge devices becomes the minimum value that satisfies the condition of the above formula (1). Consequently, the device selection unit 30 selects the image forming devices 10B, 10C, and 10D as bridge devices, and treats the other image forming devices 10E to 10p as parents. Note that in the example illustrated in FIG. 5, the communication session count S is the same for both the image forming device 10D and the image forming device 10E. In this case, the device selection unit 30 may treat either one of the image forming devices 10D and 10E as a bridge device candidate.

FIG. 6 illustrates an example of connection relationships among a child, bridge devices, and parents. The image forming device 10A that acts as the child has a communication session count of "2", and thus the image forming device 10A has a function of communicating with a maximum of two devices (bridge devices) at the same time. The image forming device 10B that acts as a bridge device has a communication session count of "5", and thus the image forming device 10B has a function of communicating with a maximum of five devices (parents) at the same time. The image forming device 10C that acts as a bridge device has a communication session count of "4", and thus the image forming device 10C has a function of communicating with a maximum of four devices (parents) at the same time. The image forming device 10D that acts as a bridge device has a communication session count of "3", and thus the image forming device 10D has a function of communicating with a maximum of three devices (parents) at the same time.

Figure 7C:
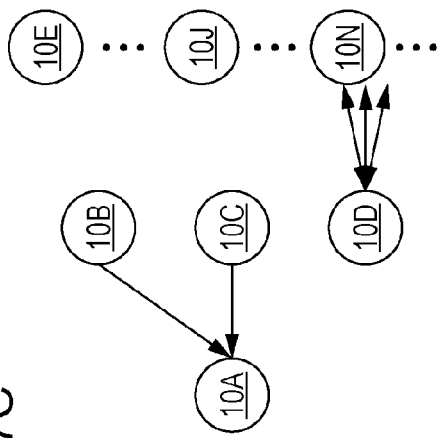
FIGS. 7A to 7D are diagrams illustrating an example of connection relationships among image forming devices.
Figure 7D:
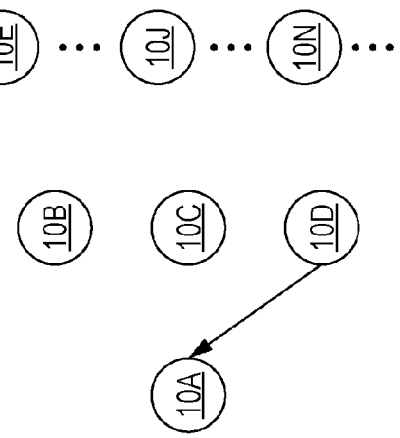
Figure 7A:
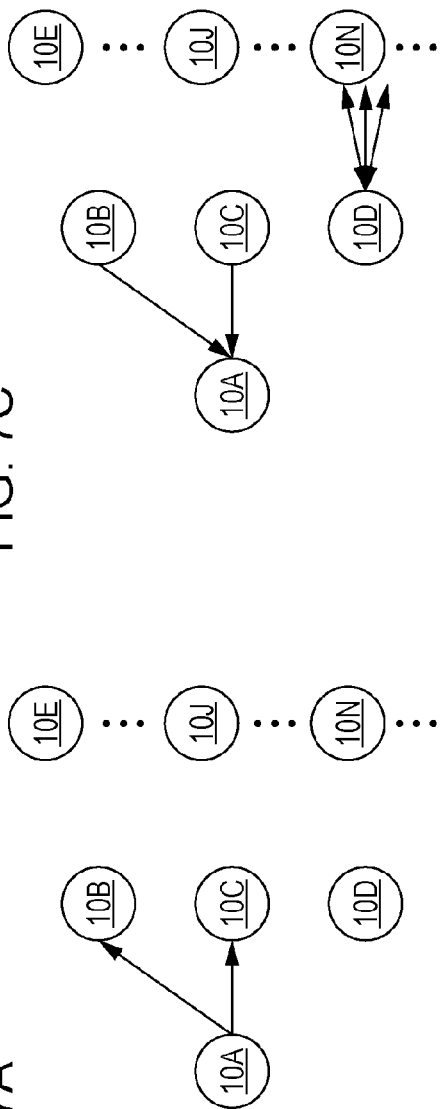

FIGS. 7A to 7D illustrate an example of more detailed connection relationships. As illustrated in FIG. 7A, first, the communication unit 14 of the image forming device 10A that acts as the child accesses the image forming devices 10B and 10C that act as bridge devices, and establishes communication with the image forming devices 10B and 10C. Since the image forming device 10A has a communication session count of "2", communication between the image forming device 10A and the image forming devices 10B and 10C is established at the same time. Subsequently, the control unit 26 of the image forming device 10A requests the image forming devices 10B and 10C to acquire related information by proxy. At this point, the control unit 26 of the image forming device 10A transmits, to the image forming device 10B, the device identification information of parents assigned to the image forming device 10B. Since the image forming device 10B has a communication session count of "5", the control unit 26 of the image forming device 10A transmits the device identification information of five parents to the image forming device 10B. Similarly, the control unit 26 of the image forming device 10A transmits, to the image forming device 10C, the device identification information of parents assigned to the image forming device 10C. Since the image forming device 10C has a communication session count of "4", the control unit 26 of the image forming device 10A transmits the device identification information of four parents to the image forming device 10C.

After the proxy request from the image forming device 10A to the image forming devices 10B and 10C is completed, the communication between the image forming device 10A and the image forming devices 10B and 10C ends for the time being, and the communication is terminated.

Figure 7B:
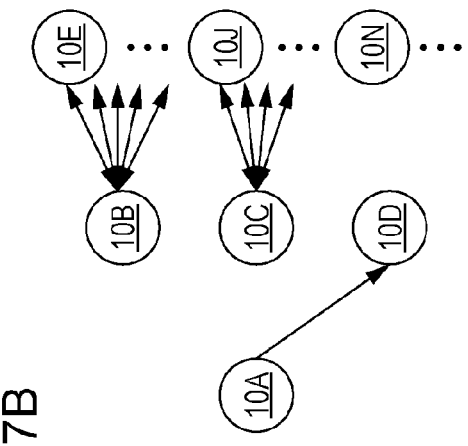

Next, as illustrated in FIG. 7B, the communication unit 14 of the image forming device 10B accesses the five parents assigned to itself (for example, the image forming device 10E and so on), and establishes communication with the five parents. Subsequently, the acquisition unit 28 of the image forming device 10B acquires related information of image data being stored in the five parents. Also, the acquisition unit 28 of the image forming device 10B acquires related information of image data being stored in the storage unit 16 of the image forming device 10B itself. Similarly, the communication unit 14 of the image forming device 10C accesses the four parents assigned to itself (for example, the image forming device 10J and so on), and establishes communication with the four parents. Subsequently, the acquisition unit 28 of the image forming device 10C acquires related information of image data being stored in the four parents. Also, the acquisition unit 28 of the image forming device 10C acquires related information of image data being stored in the storage unit 16 of the image forming device 10C itself.

Meanwhile, the image forming device 10A accesses the image forming device 10D that acts as a bridge device, and establishes communication with the image forming device 10D. Subsequently, the control unit 26 of the image forming device 10A requests the image forming device 10D to acquire related information by proxy. At this point, the control unit 26 of the image forming device 10A transmits, to the image forming device 10D, the device identification information of parents assigned to the image forming device 10D. Since the image forming device 10D has a communication session count of "3", the control unit 26 of the image forming device 10A transmits the device identification information of three parents to the image forming device 10D.

Note that the parents assigned to the image forming devices 10B, 10C, and 10D that act as bridge devices are selected by the device selection unit 30 of the image forming device 10A. The device selection unit 30 may assign arbitrary parents to each bridge device. Alternatively, the device selection unit 30 may select the parents to assign to each bridge device according to a parent selection process discussed later.

After the proxy request from the image forming device 10A to the image forming device 10D is completed, the communication between the image forming device 10A and the image forming device 10D ends for the time being, and the communication is terminated.

Next, as illustrated in FIG. 7C, the communication unit 14 of the image forming devices 10B and 10C accesses the image forming device 10A, and establishes communication with the image forming device 10A. Subsequently, the communication unit 14 of the image forming device 10B transmits related information acquired from the parents and the image forming device 10B itself to the image forming device 10A. After the transmission of related information from the image forming device 10B to the image forming device 10A is completed, the communication between the image forming devices 10A and 10B is terminated. Similarly, the communication unit 14 of the image forming device 10C transmits related information acquired from the parents and the image forming device 10C itself to the image forming device 10A. After the transmission of related information from the image forming device 10C to the image forming device 10A is completed, the communication between the image forming devices 10A and 10C is terminated.

Meanwhile, the communication unit 14 of the image forming device 10D accesses the three parents assigned to itself (for example, the image forming device 10N and so on), and establishes communication with the three parents. Subsequently, the acquisition unit 28 of the image forming device 10D acquires related information of image data being stored in the three parents. Also, the acquisition unit 28 of the image forming device 10D acquires related information of image data being stored in the storage unit 16 of the image forming device 10D itself.

Next, as illustrated in FIG. 7D, the communication unit 14 of the image forming device 10D accesses the image forming device 10A, and establishes communication with the image forming device 10A. Subsequently, the communication unit 14 of the image forming device 10D transmits related information acquired from the parents and the image forming device 10D itself to the image forming device 10A. After the transmission of related information from the image forming device 10D to the image forming device 10A is completed, the communication between the image forming devices 10A and 10D is terminated.

As above, the image forming device 10A that acts as a child uses the image forming devices 10B, 10C, and 10D that act as bridge devices to acquire related information of image data being stored in the image forming devices 10B to 10P. Consequently, the time to complete the acquisition of related information is shortened compared to the case of the image forming device 10A that acts as the child acquiring the related information by directly accessing all of the image forming devices 10B to 10P. Also, by selecting bridge devices according to the above formula (1), each bridge device acquires related information from the parents assigned to itself during a single communication period. In other words, each bridge device may avoid communicating with the parents multiple times. Consequently, the time to complete the acquisition of related information is shortened compared to the case of each bridge device acquiring the related information by establishing communication with the parents multiple times.

(Parent Selection Process)

Next, a process of selecting parents to assign to a bridge device will be described in detail. The device selection unit 30 of the child selects parents to assign to each bridge device by using the history information 20.

The communication session count and communication performance of each bridge device may vary by bridge device in some cases. If a parent storing a relatively large amount of image data is assigned to a bridge device with poor communication performance, acquiring related information may take a large amount of time. Conversely, by assigning a parent storing a relatively large amount of image data to a bridge device with a relatively large communication session count and high communication performance, the time to acquire related information may be shortened. Also, if there is variation in the data size of the image data stored in each parent, an acquisition process (communication session) with a short acquisition time and an acquisition process (communication session) with a long acquisition time may coexist in the same bridge device. In this case, other communication sessions are not used until the acquisition process with a long acquisition time is completed, and as a result, a large amount of time is taken to transmit the related information to the child.

To address the above situation, in the exemplary embodiment, the device selection unit 30 uses the history information 20 to assign parents predicted to store a relatively large amount of image data to bridge devices with a relatively large communication session count and a relatively high communication performance. Consequently, the time to acquire related information is shortened compared to the case of assigning parents predicted to store a relatively large amount of image data to bridge devices with a relatively small communication session count and a relatively low communication performance.

A parent assignment procedure will be described in detail. Herein, suppose that the image forming device 10A is the child, and the image forming devices 10B, 10C, and 10D are selected as bridge devices.

First, the device selection unit 30 of the image forming device 10A references the history information 20 of a user α using the child, and sorts the order of the image forming devices 10E to 10P in the device list 18 in order of highest utilization by the user α, and additionally, in order of largest average value of the data size of the image data previously handled by the user α. For example, if storage history information is used as the history information 20, the device selection unit 30 sorts in order of largest storage count of the user α, and additionally, in order of largest average value of the data size per one storage process. Also, if acquisition history information is used as the history information 20, the device selection unit 30 sorts in order of largest acquisition count of the user α, and additionally, in order of largest average value of the data size per one acquisition process. Subsequently, the device selection unit 30 assigns parents with a relatively high utilization and a relatively large average value of the data size to bridge devices with a relatively large communication session count and a relatively high communication performance.

More specifically, on the basis of the utilization and the average value of the data size, the device selection unit 30 predicts the degree of load related to acquiring related information from each parent, and assigns parents to bridge devices in accordance with the degree of load. The predicted load value expressed in the following formula (2) indicates the degree of load.

$$R_{D_iU_a} = (w_u \times U_{D_iU_a}) + (W_j \times J_{D_iU_a}) \quad (2)$$

Herein, $D_iU_a$ is an ID indicating the user α with respect to the parent $D_i$, $R_{D_iU_a}$ is the predicted load value of the user α with respect to the parent $D_i$, and $U_{D_iU_a}$ is the utilization by the user α with respect to the parent $D_i$. The term $w_u$ is a weighting coefficient for the utilization, for which an arbitrary value is used. The term $J_{D_iU_a}$ is the average data size (in KB) of the user α with respect to the parent $D_i$. If storage history information is used as the history information 20, the average value of the data size per one storage process is used as the average data size. If acquisition history information is used as the history information 20, the average value of the data size per one acquisition process is used as the average data size. The term $w_j$ is a weighting coefficient for the average data size, for which an arbitrary value is used.

Subsequently, the device selection unit 30 assigns parents with a relatively large predicted load value to bridge devices with a relatively large communication session count and a relatively high communication performance.

A parent with a high predicted load value has been used previously a high number of times, and in addition, the data size of previously handled image data is large. Consequently, for a parent with a high predicted load value, the data size of image data actually being stored is predicted to be relatively large.

Note that although the predicted load value is calculated using the utilization and the average data size in the above example, the degree of load may also be predicted by using other values.

FIG. 8 illustrates an example of the utilization of average data size of each parent. For example, for the image forming device 10E that acts as a parent, the utilization by the user α is "1%", and the average data size for the user α is "100 (KB)".

Figure 9:
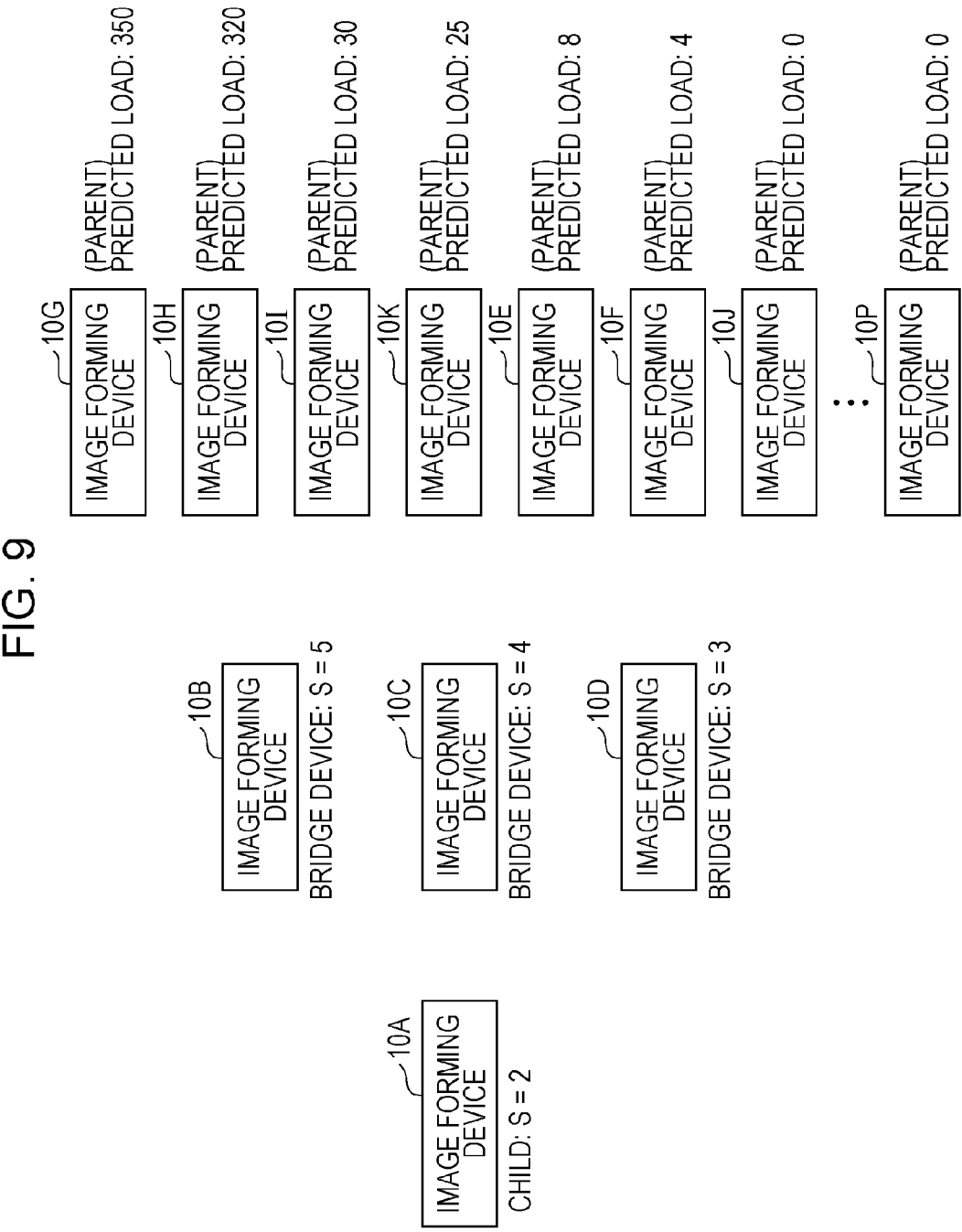
FIG. 9 is a diagram illustrating an example of predicted load values with respect to parents.

FIG. 9 illustrates an example of predicted load values calculated according to the above formula (2). Additionally, the order of the parents has been sorted in order of largest predicted load value. For example, the image forming device 10G that acts as a parent has a predicted load value of "350", and the predicted load value of the image forming device 10G is the largest.

Figure 10:
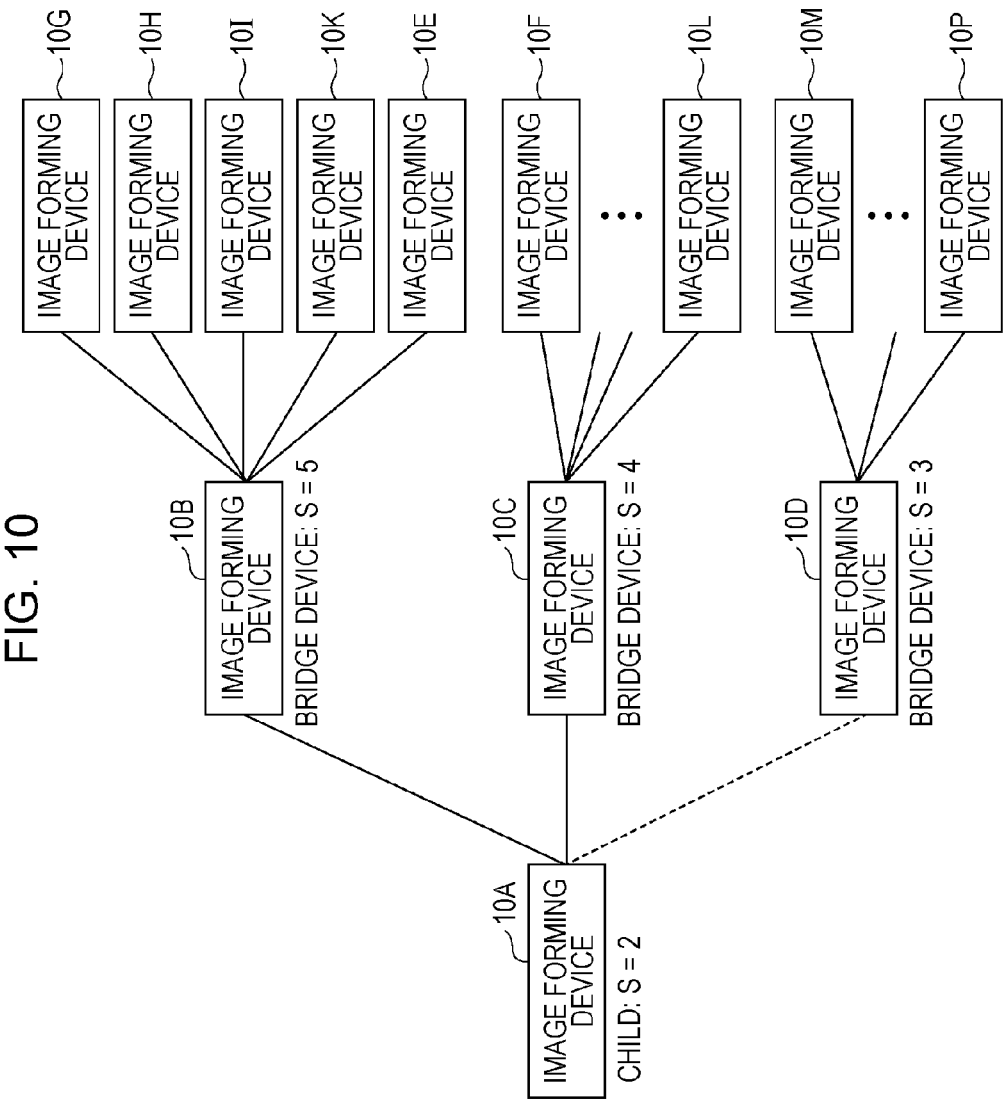
FIG. 10 is a diagram illustrating an example of connection relationships among image forming devices.

FIG. 10 illustrates an example of connection relationships among a child, bridge devices, and parents. For example, the image forming device 10B that acts as a bridge device has a communication session count of "5", and a NIC performance of "10 GB-TX" as the communication performance. The communication session count of the image forming device 10B is larger than the communication session counts of the other image forming devices 10C and 10D that act as bridge devices. Also, suppose that the communication performance of the image forming device 10B is higher than the communication performance of the image forming devices 10C and 10D.

In this case, the device selection unit 30 assigns five parents to the image forming device 10B in order of the parents with the highest predicted load value. In the example illustrated in FIG. 10, the image forming devices 10G, 10H, 10I, 10K, and 10E are assigned to the image forming device 10B in order of the parents with the highest predicted load value. Consequently, parents predicted to store image data with a relatively large data size are assigned to the image forming device 10B (a high-performance bridge device).

Also, the communication session count of the image forming device 10C is larger than the communication session count of the image forming device 10D. Suppose that the communication performance of the image forming device 10C is higher than the communication performance of the image forming device 10D. In this case, the device selection unit 30 assigns four parents to the image forming device 10C in order of the parents with the next-highest predicted load value. Subsequently, the device selection unit 30 assigns the remaining parents to the image forming device 10D.

Consequently, parents predicted to store image data with a relatively small data size are assigned to the image forming devices 10C and 10D (low-performance bridge devices).

According to the above process, parents with a relatively high degree of load related to the process of acquiring related information are assigned to a bridge device with a relatively large communication session count and a relatively high communication performance (a high-performance bridge device). Consequently, the time to complete the acquisition of related information is shortened compared to the case of assigning parents with a relatively high degree of load to bridge devices with a relatively small communication session count and a relatively low communication performance (low-performance bridge devices). For example, even if there exist multiple parents storing large amounts of image data, by assigning a high-performance bridge device to the relevant multiple parents, the acquisition of large amounts of related information is executed in parallel. Consequently, the time to complete the acquisition of related information is shortened compared to the case of assigning the relevant multiple parents to a low-performance bridge device.

Also, parents with a relatively low degree of load related to the acquisition of related information are assigned to a low-performance bridge device. Consequently, while the image forming device 10B that acts as a high-performance bridge device is performing an acquisition process, acquisition processes by the image forming devices 10C and 10D that act as low-performance bridge devices may be completed. For example, if parents with a predicted load value of "0" are assigned to the image forming devices 10C and 10D, the acquisition processes of the image forming devices 10C and 10D may be completed during the acquisition process of the image forming device 10B, even though the performance of the image forming devices 10C and 10D is low.

By assigning parents to bridge devices as above, when each bridge device establishes communication with a child, it is possible to avoid a situation in which communication between the child and each bridge device is established at the same time. Consequently, the limited communication session count of the child is used efficiently. For example, if the acquisition process by the image forming device 10D finishes first, communication between the image forming device 10D and the image forming device 10A is established, and related information is transmitted from the image forming device 10D to the image forming device 10A. After the transmission process is completed, the communication between the image forming devices 10A and 10D is terminated. After that, if the acquisition process by the image forming device 10C finishes second, communication between the image forming device 10C and the image forming device 10A is established, and related information is transmitted from the image forming device 10C to the image forming device 10A. After the transmission process is completed, the communication between the image forming devices 10A and 10C is terminated. After that, if the acquisition process by the image forming device 10B finishes third, communication between the image forming device 10B and the image forming device 10A is established, and related information is transmitted from the image forming device 10B to the image forming device 10A. After the transmission process is completed, the communication between the image forming devices 10A and 10C is terminated. In this way, the limited communication session count of the child is used efficiently, and related information may be transmitted successively from each bridge device to the child.

Figure 11:
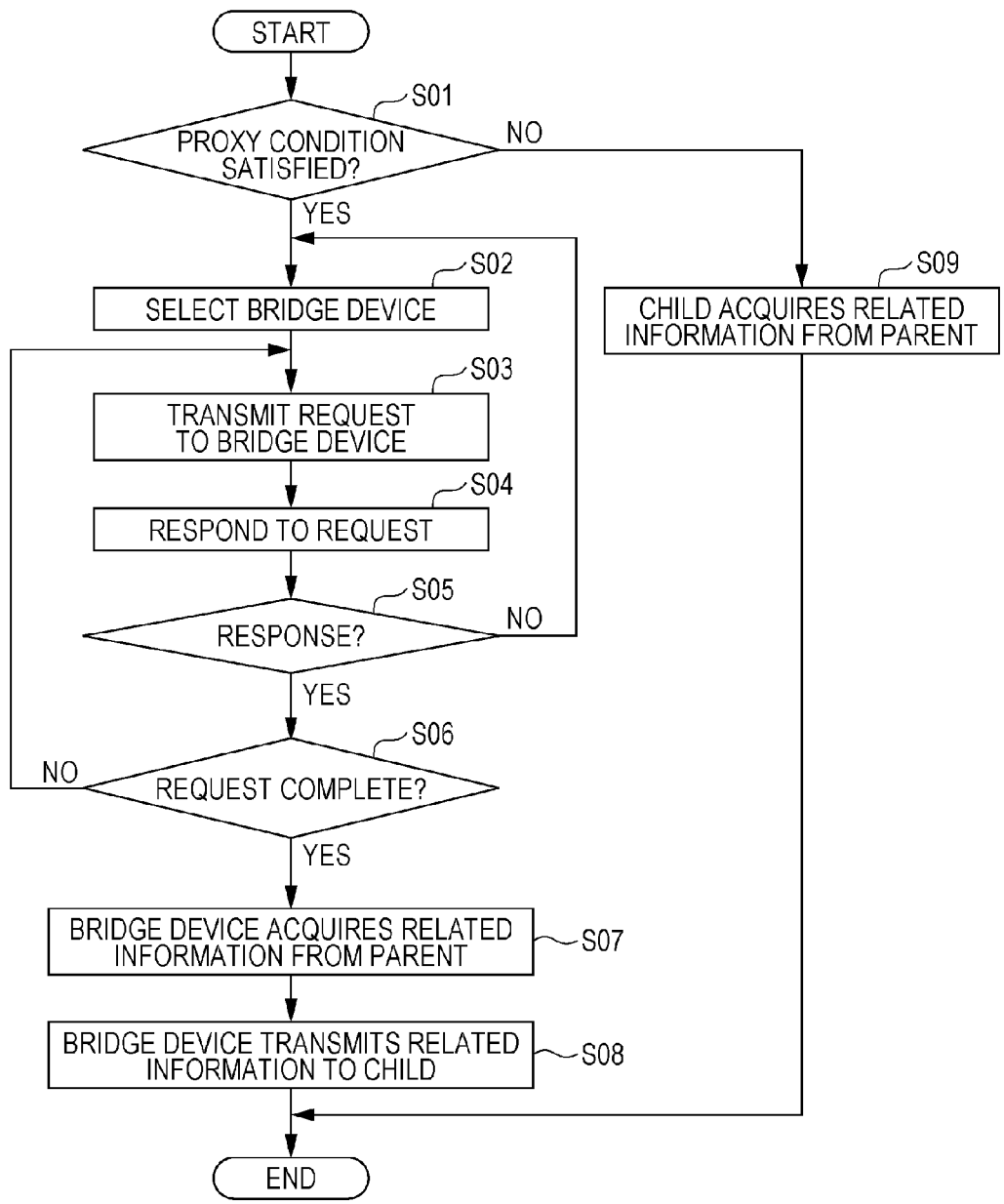
FIG. 11 is a flowchart illustrating an example of a process by an image forming device.

Next, an example of a process by the image forming device 10 will be described with reference to the flowchart illustrated in FIG. 11. Herein, suppose that the image forming device 10A is the child, and the user α prints image data using the image forming device 10A.

First, user authentication is executed. Thus, the user α uses the operating unit of the UI unit 22 or the card reading unit 24 to input user identification information and security information into the image forming device 10A. After this information is input, in the image forming device 10A, the control unit 26 cross-references the input user identification information and security information with user identification information and security information included in the authentication information stored in the storage unit 16. If the information matches, authentication is successful, whereas if the information does not match, authentication fails. If authentication fails, the process ends. Note that the authentication process may also be executed by an authentication server. In this case, the authentication information is stored in the authentication server. When user identification information and security information is input into the image forming device 10A, the information is transmitted to the authentication server. The authentication server conducts an authentication process and transmits an authentication result to the image forming device 10A. If authentication is successful, an application for printing image data being stored in the image forming devices 10A to 10p is activated.

Subsequently, if the status of the image forming system satisfies a proxy condition (S01, Yes), the process illustrated in steps S02 to S08 (acquisition process using a bridge device) is executed. On the other hand, if the status of the image forming system does not satisfy a proxy condition (S01, No), the process illustrated in step S09 (acquisition process by direct access) is executed.

The control unit 26 of image forming device 10A executes either the acquisition process using a bridge device or the acquisition process by direct access, on the basis of the number of devices, communication session counts, communication performance, and internal processing performance of the image forming devices 10 stated in the device list 18. Note that if the device list 18 is stored in a server, the control unit 26 may reference the device list 18 stored in the server.

For example, if the number of parents is greater than the communication session count of the child (image forming device 10A), the acquisition process using a bridge device is executed. If the number of parents is greater than the communication session count of the child and the child directly accesses the parents, the number of accesses increases, and the time to complete the process of acquiring related information increases. For this reason, the acquisition process using a bridge device is executed. On the other hand, if the number of parents is less than or equal to the communication session count of the child (image forming device 10A), the acquisition process by direct access is executed. This is because the child is able to acquire related information from all parents during a single communication period.

Also, if the number of parents whose communication performance satisfies a communication performance condition is equal to or greater than a prescribed number, the acquisition process using a bridge device may be executed, whereas if the number of such parents is less than the prescribed number, the acquisition process by direct access may be executed. For example, if the number of parents having a communication speed equal to or greater than a prescribed speed is equal to or greater than a prescribed number, the acquisition process using a bridge device is executed, whereas if the number of such parents is less than the prescribed number, the acquisition process by direct access is executed. If the number of parents having a communication speed equal to or greater than the prescribed speed is less than the prescribed number, a bridge device whose communication speed is less than the prescribed speed may be selected. In this case, the time to complete the acquisition process may be shorter if the child directly accesses the parents. On the other hand, if the number of parents having a communication speed equal to or greater than the prescribed speed is equal to or greater than the prescribed number, a bridge device whose communication speed is equal to or greater than the prescribed speed may be selected. In this case, the time to complete the acquisition process may be shortened compared to the case of the child directly accessing the parents. For this reason, either the acquisition process using a bridge device or the acquisition process by direct access may be selected according to the communication performance. Note that the values of the prescribed number of devices and the prescribed speed may be preconfigured values, or changed to arbitrary values by an administrator or the like.

Also, if the number of parents whose internal processing performance satisfies an internal processing performance condition is equal to or greater than a prescribed number, the acquisition process using a bridge device may be executed, whereas if the number of such parents is less than the prescribed number, the acquisition process by direct access may be executed. The internal processing performance is, for example, the CPU processing speed, the memory capacity, and the bus transfer speed. For example, if the number of parents having an internal processing performance equal to or greater than a prescribed performance is equal to or greater than a prescribed number, the acquisition process using a bridge device is executed, whereas if the number of such parents is less than the prescribed number, the acquisition process by direct access is executed. If the number of parents having an internal processing performance equal to or greater than the prescribed performance is less than the prescribed number, a bridge device whose internal processing performance is less than the prescribed performance may be selected. In this case, the time to complete the acquisition process may be shorter if the child directly accesses the parents. On the other hand, if the number of parents having an internal processing performance equal to or greater than the prescribed performance is equal to or greater than the prescribed number, a bridge device whose internal processing performance is equal to or greater than the prescribed performance may be selected. In this case, the time to complete the acquisition process is shortened compared to the case of the child directly accessing the parents. For this reason, either the acquisition process using a bridge device or the acquisition process by direct access may be selected according to the internal processing performance. Note that the prescribed number of devices and the prescribed performance may be preconfigured, or arbitrarily changed by an administrator or the like.

If the proxy condition is satisfied (S01, Yes), the device selection unit 30 of the image forming device 10A selects bridge devices from among the image forming devices 10B to 10p (S02). For example, bridge devices are selected according to the above formula (1). Also, the device selection unit 30 selects parents to assign to each bridge device. The device selection unit 30 may assign arbitrary parents to each bridge device, or assign parents selected on the basis of predicted load values to each bridge device.

Subsequently, the control unit 26 of the image forming device 10A requests a bridge device to acquire related information by proxy (S03). At this point, the control unit 26 of the image forming device 10 transmits, to the bridge device, the device identification information of parents assigned to the bridge device. The control unit 26 of the bridge device receives the request from the image forming device 10A, and returns to the image forming device 10A a response to the request (S04). If a response is returned from the bridge device within a preconfigured time (S05, Yes), the process proceeds to step S06. Subsequently, if requests to all bridge devices are completed, and a response is returned from all bridge devices (S06, Yes), the process proceeds to step S07. On the other hand, if a response is not returned from a bridge device within a preconfigured time (S05, No), the device selection unit 30 of the image forming device 10A selects another bridge device in place of the relevant bridge device (S02). If a response is not returned from a bridge device, the status is assumed to be that the power supply of the relevant bridge device is turned off, or that the relevant bridge device is temporarily disconnected from the communication link N, for example. For this reason, if a response is not returned from a bridge device, another bridge device is selected. Subsequently, the process from step S02 to S05 is repeatedly executed until a bridge device that returns a response is found. Also, if requests to all bridge devices are not complete (S06, No), the process from step S03 to S06 is repeatedly executed until the relevant requests are completed.

In step S07, the acquisition unit 28 of the bridge device accesses parents assigned to itself. If the user α's image data is being stored in any of the parents, the acquisition unit 28 of the bridge device acquires the related information of that image data from the relevant parents. Also, if the user α's image data is being stored in the storage unit 16 of bridge device itself, the acquisition unit 28 of that bridge device acquires the related information of that image data from the storage unit 16.

Subsequently, the communication unit 14 of the bridge device transmits the related information acquired from the parents and the image forming device 10B itself to the image forming device 10A (S08). As a result, the image forming device 10A that acts as the child acquires the related information of the user α's image data.

On the other hand, if the proxy condition is not satisfied (S01, No), the image forming device 10A that acts as the child directly accesses the parents. If the user α's image data is being stored in any of the parents, the acquisition unit 28 of the image forming device 10A acquires the related information of that image data from the relevant parents (S09).

Figure 12:
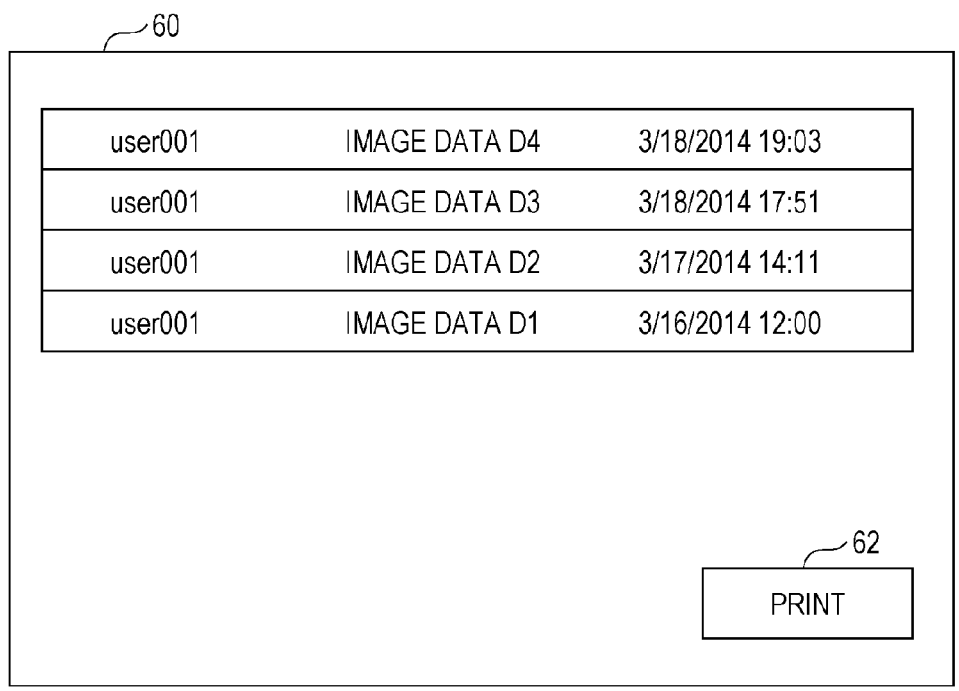
FIG. 12 is a diagram illustrating an example of a screen on a display unit.

After the image forming device 10A acquires related information as above, the control unit 26 of the image forming device 10A causes the display unit of the UI unit 22 to display the related information. FIG. 12 illustrates a display example. On a screen 60 of the display unit, a list of related information for image data D1 to D4 is displayed. Specifically, the user α's user ID ("user001"), the image data ID (such as "Image data D1"), and a creation time are displayed.

Subsequently, if the user uses the operating unit of the UI unit 22 to select image data to be printed from the list of related information being displayed on the display unit, the acquisition unit 28 of the image forming device 10A acquires the selected image data. For example, if the image data D1 is selected, the acquisition unit 28 accesses the image forming device 10 storing the image data D1, and acquires the image data D1 from that image forming device 10. Subsequently, if the user gives an instruction to print, the image forming unit 12 of the image forming device 10A forms an image corresponding to the image data D1 on a sheet of paper. For example, a print button 62 is provided on the screen 60, and a print instruction is given by having the user press the print button 62. Note that the acquisition unit 28 may acquire the image data D1 at the stage when the print button 62 is pressed, and subsequently, the image forming unit 12 may form an image corresponding to the image data D1 on a sheet of paper.

According to the exemplary embodiment, by using a bridge device when the status of the image forming system satisfies a proxy condition, the time to complete the acquisition of related information may be shortened compared to the case of the image forming device 10A that acts as the child acquiring the related information by directly accessing all of the image forming devices 10B to 10P.

(Other Exemplary Embodiment)

In the foregoing exemplary embodiment, bridge devices are selected according to the formula (1). In this case, the number of bridge devices is decided so that the acquisition process by each bridge device is finished after conducting the acquisition process just once. However, the exemplary embodiment is not limited to this example, and the acquisition process by a bridge device may also be executed multiple times. For example, by selecting an image forming device 10 having a greater communication session count than the child as a bridge device, the time to complete the acquisition process is shortened compared to the case of the child directly accessing the parents. FIGS. 13A to 13D illustrate a specific example of this process.

Herein, suppose a case in which the image forming device 10A that acts as the child has a communication session count of "2", and one bridge device is selected. For example, suppose that the image forming device 10B with a communication session count of "5" is selected as the bridge device.

Figure 13C:
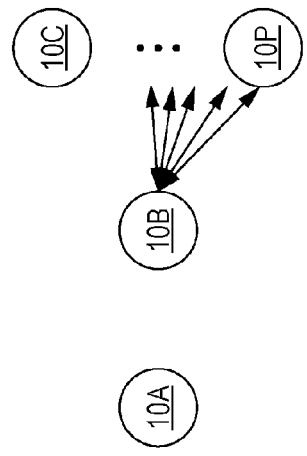
FIGS. 13A to 13D are diagrams illustrating another example of connection relationships.
Figure 13D:
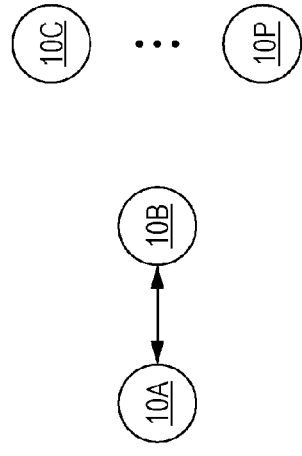
Figure 13A:
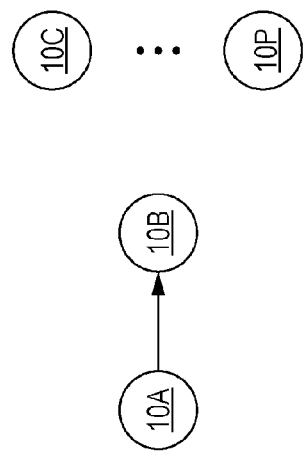

As illustrated in FIG. 13A, the image forming device 10A establishes communication with the image forming device 10B, and requests the image forming device 10B to acquire related information by proxy. In this case, the parents assigned to the image forming device 10B are the 14 image forming devices 10C to 10P.

Figure 13B:
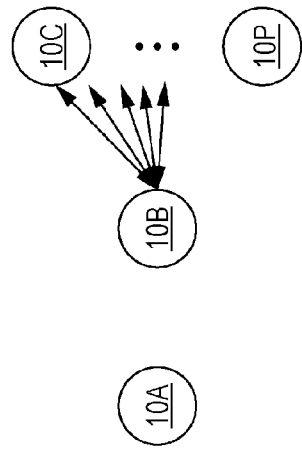

As illustrated in FIG. 13B, the image forming device 10B accesses five image forming devices 10 (parents) from among the image forming devices 10C to 10P, and acquires related information from these five image forming devices 10 (parents). Similarly thereafter, as illustrated in FIG. 13C, the image forming device 10B accesses five different image forming devices 10 (parents), and acquires related information from these five image forming devices 10 (parents). Additionally, the image forming device 10B acquires related information being stored in the storage unit 16 of itself (the image forming device 10B).

Subsequently, as illustrated in FIG. 13D, the image forming device 10B transmits the related information acquired from the image forming devices 10B to 10P to the image forming device 10A.

As above, by using a bridge device with a larger communication session count than the child, related information is acquired by a smaller number of accesses compared to the case of the child acquiring related information by directly accessing the parents. As a result, the time to complete the acquisition process is shortened.

(Another Exemplary Embodiment)

As another exemplary embodiment, the case of using a secondary bridge device will be described. FIG. 14 illustrates an example of connection relationships among a child, bridge devices, secondary bridge devices, and parents. For example, the image forming device 10A is the child, and the image forming devices 10B and 10C are selected as bridge devices. Also, the image forming devices 10D and 10F are selected as secondary bridge devices. The image forming device 10D that acts as a secondary bridge device acquires related information from devices such as the image forming device 10H that acts as a parent, and also acquires related information being stored in the storage unit 16 of the image forming device 10D itself. Subsequently, the image forming device 10D transmits the acquired related information to the image forming device 10B that acts as a bridge device. The image forming device 10B that acts as a bridge device acquires related information from the image forming device 10E that acts as a parent, and also acquires related information being stored in the storage unit 16 of the image forming device 10B itself. Subsequently, the image forming device 10B transmits the acquired related information to the image forming device 10A that acts as the child. Also, the image forming device 10F that acts as a secondary bridge device acquires related information from devices such as the image forming device 10L that acts as a parent, and also acquires related information being stored in the storage unit 16 of the image forming device 10F itself. Subsequently, the image forming device 10F transmits the acquired related information to the image forming device 10C that acts as a bridge device. The image forming device 10C that acts as a bridge device acquires related information from the image forming device 10G that acts as a parent, and also acquires related information being stored in the storage unit 16 of the image forming device 10C itself. Subsequently, the image forming device 10C transmits the acquired related information to the image forming device 10A that acts as the child.

As above, even in the case of using secondary bridge devices, the time to complete the acquisition process is shortened compared to the case of the child acquiring related information by accessing all parents.

Note that in the example illustrated in FIG. 14, the bridge devices are connected to the secondary bridge devices and the parents, but this is merely one example. Connecting only secondary bridge devices to the bridge devices is also possible. Additionally, tertiary bridge devices and so on may also be selected.

Effects according to the exemplary embodiment will now be described while also giving a comparative example. In the comparative example, the child accesses all parents, irrespectively of the number of parents or the communication session count of the child. For example, suppose that the child has a communication session count of "2", and the number of parents is three. In this case, the child communicates with two parents at the same time. However, communication between the third parent and the child is not conducted until the communication with either of the first two parents ends, and as a result, the time to complete the processing of acquiring related information increases. As the number of parents increases, the time also increases. For example, if there are 500 parents, theoretically the acquisition time is 50 times longer than the case of 10 parents.

In contrast, in the exemplary embodiment, by selecting bridge devices on the basis of the number of parents and the communication session count of the child, and using the selected bridge devices, for example, the process of acquiring related information is completed in a shorter time compared to the comparative example.

FIG. 15 illustrates a specific example of process times according to the exemplary embodiment. In FIG. 15, the horizontal axis represents time, while the vertical axis represents each image forming device 10. The following supposes a case in which 101 image forming devices 10 are included in the image forming system. Also, four bridge devices (bridge device 1 to 4) are selected. Consequently, the number of parents is 96. The communication session count of the child and each bridge device is "2". In this example, the bridge devices access the parents multiple times, and execute the process of acquiring related information multiple times.

As illustrated in FIG. 15, the child establishes communication with the bridge devices 1 and 2, and requests the bridge devices 1 and 2 to acquire related information by proxy (sign 70). After the requests finish, the child establishes communication with the bridge devices 3 and 4, and requests the bridge devices 3 and 4 to acquire related information by proxy (sign 72). The length of the arrows labeled with the signs 70 and 72 indicates the length of time that the child communicates with the bridge devices. Also, the number of arrows indicates the communication session count. The bridge devices 1 and 2, after receiving the request from the child, establish communication with the assigned parents, request the parents to acquire related information, and acquire related information from the parents (signs 74 and 76). The bridge devices 3 and 4 are similar (signs 78 and 80). The signs 82 to 94 indicate the status of the bridge devices establishing communication with the parents and acquiring related information from the parents. The length of the arrows labeled with the signs 74 to 92 indicates the sum of the length of time that the bridge devices interpret the request (dashed line part) and the length of time that the bridge devices communicate with the parents and acquire related information (solid line part). Also, the length of the arrows labeled with the signs 94 and 96 indicates the sum of the length of time that the parents acquire related information from themselves (dashed line part) and the length of time that the parents transmit the related information to the bridge devices (solid line part). The length of the arrows labeled with the signs 98 and 100 indicates the length of time that the child acquires, from the bridge devices, the related information being stored in the bridge devices and the parents. In the example illustrated in FIG. 15, during the stage of communication labeled with the signs 98 and 100, the child is collectively acquiring, from the bridge devices, the related information being stored in the bridge devices and the parents.

FIG. 16 illustrates a specific example of process times according to the comparative example. The comparative example supposes the case of the child directly accessing 100 parents. The child establishes communication with the parents 1 and 2, and requests the parents to acquire related information (sign 200). After the requests finish, the child establishes communication with the parents 3 and 4, and requests the parents 3 and 4 to acquire related information (sign 202). The parents 1 and 2, after receiving the request from the child, acquire the related information being stored in the parents themselves, and transmit the related information to the child (signs 212 and 214). The parents 3 and 4 are similar (signs 216 and 218). Subsequently, the child acquires related information from the parents 1 and 2 (sign 204). Similarly thereafter, the length of the arrows labeled with the signs 200 to 210 indicates the length of time that the child communicates with the parents. Also, the length of the arrows labeled with the signs 212 to 222 indicates the sum of the length of time that the parents acquire related information from themselves (dashed line part) and the length of time that the parents transmit the related information to the child (solid line part).

In the comparative example illustrated in FIG. 16, the child successively accesses 100 parents. Since the child has a communication session count of "2", the child must execute the acquisition process a total of 100/2=50 times. On the other hand, in the example of the exemplary embodiment illustrated in FIG. 15, four bridge devices successively access the parents to acquire related information, and the child collectively acquires the related information from the four bridge devices. Since each bridge device has a communication session count of "2", a total of eight communication sessions are established at the same time. Consequently, the number of acquisition processes conducted by the four bridge devices becomes a total of 96/4=16. In this way, by using bridge devices, the acquisition process is completed with a smaller number of accesses compared to the comparative example. Note that the child may also access parents and acquire related information from parents while the bridge devices are accessing parents.

Note that in the above exemplary embodiment, the acquisition unit 28 acquires related information first, and after that, acquires image data selected by the user. As a separate example, the acquisition unit 28 may also acquire image data without first acquiring related information. In this case, the control unit 26 causes the display unit of the UI unit 22 to display the related information of the acquired image data. If the user selects image data, the image forming unit 12 forms an image corresponding to the selected image data on a sheet of paper. Note that the data size of the image data itself is typically larger than the data size of the related information. Consequently, rather than acquiring the image data itself irrespectively whether or not there is a user selection, by acquiring the related information first, and acquiring image data according to a user selection, the total time related to data transfer may be reduced.

The image forming device 10 discussed above is realized by the cooperative action of hardware resources and software as an example. Specifically, the image forming device 10 is equipped with a processor such as a CPU (not illustrated). By having the processor load and execute a program stored in a storage device (not illustrated), the functions of the respective components of the image forming device 10 are realized. The program is stored in the storage device via a storage medium such as a CD or DVD, or alternatively, via a communication link such as a network. Alternatively, the components of the image forming device 10 may also be realized by hardware resources such as a processor or an electronic circuit, for example. A device such as memory may also be used in such a realization.

Additionally, the terminal device 40 discussed above is realized by the cooperative action of hardware resources and software as an example. Specifically, the terminal device 40 is equipped with a processor such as a CPU (not illustrated). By having the processor load and execute a program stored in a storage device (not illustrated), the functions of the respective components of the terminal device 40 are realized. The program is stored in the storage device via a recording medium such as a CD or DVD, or alternatively, via a communication link such as a network. Alternatively, the components of the terminal device 40 may also be realized by hardware resources such as a processor or an electronic circuit, for example. A device such as memory may also be used in such a realization.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device comprising at least one central processing unit (CPU) configured to:
    select, as a bridge device, an image forming device having a largest communication session count from among a plurality of other connected image forming devices based on communication session counts of the plurality of other connected image forming devices;
    cause the bridge device to access a number of the plurality of other connected image forming devices other than the bridge device, the number being equal to the communication session count of the bridge device;
    cause the bridge device to acquire, from each of the accessed other connected image forming devices, information related to image data being stored in the accessed other connected image forming device; and
    acquire, from the bridge device, the acquired information related to the image data.

2. The image forming device according to claim 1, wherein
    the at least one CPU selects a target number of bridge devices from among the plurality of other connected image forming devices, in order of a largest communication session count, and
    the at least one CPU causes each of the target number of bridge devices to
        access a number of other connected image forming devices corresponding to the communication session count of the bridge device, and
        to acquire information related to image data from each of the accessed other connected image forming devices.

3. The image forming device according to claim 2, wherein
    the at least one CPU selects one or a plurality of bridge devices so that a total communication session count of the selected one or plurality of bridge devices is equal to or greater than a number of other image forming devices other than the bridge device among the plurality of other image forming devices.

4. The image forming device according to claim 3, wherein
    the at least one CPU selects and assigns, to each selected bridge device, the plurality of other connected image forming devices to be accessed by the bridge device, based on the communication session count of the bridge device and acquisition process loads of the plurality of other connected image forming devices.

5. The image forming device according to claim 3, wherein
    the at least one CPU selects and assigns, to each selected bridge device, the plurality of other connected image forming devices to be accessed by the bridge device, based on the communication session count of the bridge device and communication performances and internal processing performances of the plurality of other connected image forming devices.

6. The image forming device according to claim 2, wherein
    the at least one CPU selects and assigns, to each selected bridge device, the plurality of other connected image forming devices to be accessed by the bridge device, based on the communication session count of the bridge device and acquisition process loads of the plurality of other connected image forming devices.

7. The image forming device according to claim 2, wherein
    the at least one CPU selects and assigns, to each selected bridge device, the plurality of other connected image forming devices to be accessed by the bridge device, based on the communication session count of the bridge device and communication performances and internal processing performances of the plurality of other connected image forming devices.

8. The image forming device according to claim 1, wherein
    the at least one CPU selects one or a plurality of bridge devices so that a total communication session count of the selected one or plurality of bridge devices is equal to or greater than a number of other image forming devices other than the bridge device among the plurality of other image forming devices.

9. The image forming device according to claim 8, wherein
    the at least one CPU selects and assigns, to each selected bridge device, the plurality of other connected image forming devices to be accessed by the bridge device, based on the communication session count of the bridge device and acquisition process loads of the plurality of other connected image forming devices.

10. The image forming device according to claim 8, wherein
    the at least one CPU selects and assigns, to each selected bridge device, the plurality of other connected image forming devices to be accessed by the bridge device, based on the communication session count of the bridge device and communication performances and internal processing performances of the plurality of other connected image forming devices.

11. The image forming device according to claim 1, wherein
    the at least one CPU selects and assigns to the bridge device the plurality of other connected image forming devices to be accessed by the bridge device, based on the communication session count of the bridge device and acquisition process loads of the plurality of other connected image forming devices.

12. The image forming device according to claim 1, wherein
    the at least one CPU selects and assigns to the bridge device the plurality of other connected image forming devices to be accessed by the bridge device, based on the communication session count of the bridge device, and communication performances and internal processing performances of the plurality of other connected image forming devices.

13. The image forming device according to claim 1, further comprising a display,
- wherein the at least one CPU is further configured to:
  - display the received information related to the image data on the display, and
  - in response to a selection of one piece of the displayed information, acquire, from the connected image forming device that stores the image data corresponding to the selected information, the selected image data.

14. An information processing method comprising:
- selecting, as a bridge device, an image forming device having a largest communication session count from among a plurality of other connected image forming devices based on communication session counts of the plurality of other connected image forming devices;
- causing the bridge device to access a number of the plurality of other connected image forming devices other than the bridge device, the number being equal to the communication session count of the bridge device;
- causing the bridge device to acquire, from each of the accessed other connected image forming devices, information related to image data being stored in the accessed other connected image forming device; and
- acquiring, from the bridge device, the acquired information related to the image data.

15. A non-transitory computer readable medium storing a program causing a computer to execute a process for processing information, the process comprising:
- selecting, as a bridge device, an image forming device having a largest communication session count from among a plurality of other connected image forming devices based on communication session counts of the plurality of other connected image forming devices;
- causing the bridge device to access a number of the plurality of other connected image forming devices other than the bridge device, the number being equal to the communication session count of the bridge device;
- causing the bridge device to acquire, from each of the accessed other connected image forming devices, information related to image data being stored in the accessed other connected image forming device; and
- acquiring, from the bridge device, the acquired information related to the image data.

* * * * *